United States Patent
Lakshmikantha et al.

(10) Patent No.: US 11,792,420 B2
(45) Date of Patent: Oct. 17, 2023

(54) METHODS AND APPARATUS FOR FOVEATED COMPRESSION

(71) Applicant: QUALCOMM Incorporated, San Diego, CA (US)

(72) Inventors: Sandeep Kanakapura Lakshmikantha, Bangalore (IN); Shraman Biswas, Bangalore (IN); Vinay Melkote Krishnaprasad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/073,241

(22) Filed: Oct. 16, 2020

(65) Prior Publication Data

US 2021/0136397 A1    May 6, 2021

(51) Int. Cl.
*H04N 19/48* (2014.01)
*H04L 43/08* (2022.01)

(52) U.S. Cl.
CPC ............. *H04N 19/48* (2014.11); *H04L 43/08* (2013.01)

(58) Field of Classification Search
CPC ..... H04L 43/08; H04L 43/0864; H04N 19/48; H04N 19/61; H04N 19/85; H04N 19/895
See application file for complete search history.

(56) References Cited

U.S. PATENT DOCUMENTS

| | | | | |
|---|---|---|---|---|
| 10,666,941 B1* | 5/2020 | Doron | ................ | H04N 21/2387 |
| 2007/0024706 A1* | 2/2007 | Brannon | ............ | H04N 21/6587 |
| | | | | 348/E7.071 |
| 2008/0084927 A1* | 4/2008 | Rosenzweig | ........ | H04N 19/164 |
| | | | | 375/240.02 |
| 2010/0110298 A1* | 5/2010 | Knee | ...................... | H04N 19/17 |
| | | | | 348/581 |
| 2015/0363905 A1* | 12/2015 | Pepperell | .............. | G06T 3/0037 |
| | | | | 345/427 |
| 2017/0105014 A1* | 4/2017 | Lee | ........................ | H04N 19/30 |
| 2017/0236252 A1* | 8/2017 | Nguyen | ................. | G09G 3/003 |
| | | | | 345/419 |
| 2017/0316549 A1* | 11/2017 | Dunn | ..................... | G06T 15/205 |
| 2017/0339399 A1* | 11/2017 | Hoffman | .............. | H04N 13/366 |
| 2018/0220119 A1* | 8/2018 | Horvitz | .......... | H04N 21/234363 |
| 2018/0288423 A1* | 10/2018 | Vembar | ................... | H04N 19/17 |
| 2019/0060756 A1* | 2/2019 | Marks | ................... | A63F 13/525 |

(Continued)

*Primary Examiner* — Mohammed S Rahaman

(74) *Attorney, Agent, or Firm* — QUALCOMM INCORPORATED

(57) ABSTRACT

The present disclosure relates to methods and apparatus for graphics processing. Aspects of the present disclosure can render at least one frame including display content at a server. Aspects of the present disclosure can also downscale the at least one frame including the display content, where a downscaling rate of one or more portions of the at least one frame is based on a location of each of the one or more portions. Moreover, aspects of the present disclosure can communicate the downscaled at least one frame including the display content to a client device. Aspects of the present disclosure can also encode the downscaled at least one frame including the display content. Further, aspects of the present disclosure can decode the encoded at least one frame including the display content. Aspects of the present disclosure can also upscale the at least one frame including the display content.

30 Claims, 17 Drawing Sheets

(56) References Cited

U.S. PATENT DOCUMENTS

| | | | |
|---|---|---|---|
| 2019/0096046 A1* | 3/2019 | Kalantari | G06T 5/50 |
| 2019/0347757 A1* | 11/2019 | Selvik | G06T 3/40 |
| 2020/0014953 A1* | 1/2020 | Mammou | H04N 19/597 |
| 2020/0126262 A1* | 4/2020 | Kim | H04N 19/80 |

* cited by examiner

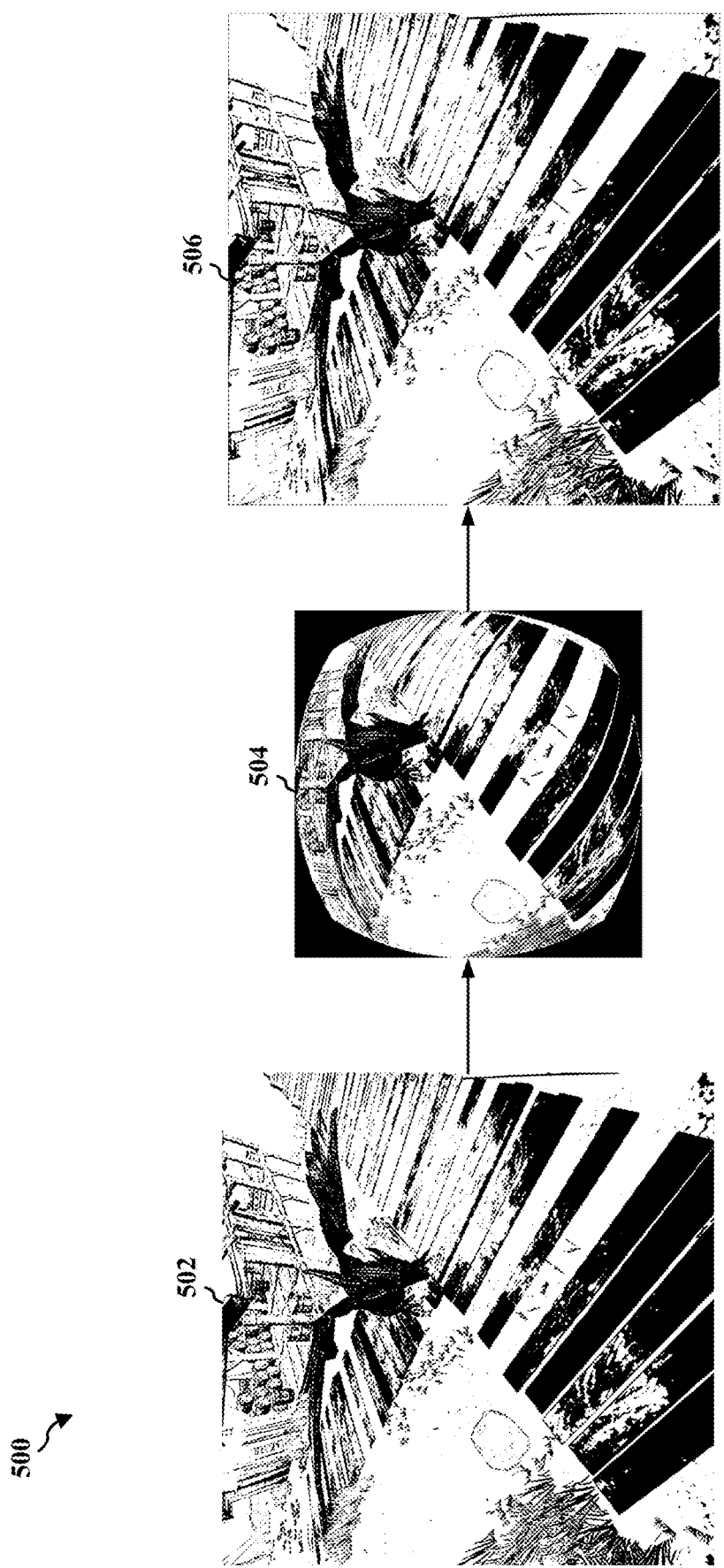

METHODS AND APPARATUS FOR FOVEATED COMPRESSION

CROSS REFERENCE TO RELATED APPLICATION(S)

This application claims the benefit of Indian Application Serial No. 201941044635, entitled "METHODS AND APPARATUS FOR FOVEATED COMPRESSION" and filed on Nov. 4, 2019, which is expressly incorporated by reference herein in its entirety.

BACKGROUND

Technical Field

The present disclosure relates generally to processing systems, and more particularly, to one or more techniques for graphics processing.

INTRODUCTION

Computing devices often perform graphics processing (e.g., utilizing a graphics processing unit (GPU)) to render graphical data for display by the computing devices. Such computing devices may include, for example, computer workstations, mobile phones such as smartphones, embedded systems, personal computers, tablet computers, and video game consoles. GPUs are configured to execute a graphics processing pipeline that includes one or more processing stages which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A device that provides content for visual presentation on a display may utilize a GPU.

Some computing devices may execute a program to present graphics content on a display. For example, a computing device may execute a virtual reality (VR) program or an augmented reality (AR) program. There is an increased need for improved computer or graphics processing, including for VR or AR programs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a server, a client device, a central processing unit (CPU), a graphics processing unit (GPU), or any apparatus that can perform computer or graphics processing. The apparatus can render at least one frame including display content at a server. The apparatus can also downscale the at least one frame including the display content, where a downscaling rate of one or more portions of the at least one frame can be based on a location of each of the one or more portions. Moreover, the apparatus can communicate the downscaled at least one frame including the display content to a client device. The apparatus can also determine the downscaling rate of the one or more portions of the at least one frame based on the location of each of the one or more portions. The apparatus can also encode the downscaled at least one frame including the display content. Further, the apparatus can decode the encoded at least one frame including the display content. The apparatus can also upscale the at least one frame including the display content, where an upscaling rate of one or more portions of the at least one frame can be based on a location of each of the one or more portions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 illustrates an example diagram including foveated compression in accordance with one or more techniques of this disclosure.

DETAILED DESCRIPTION

Figure 1:
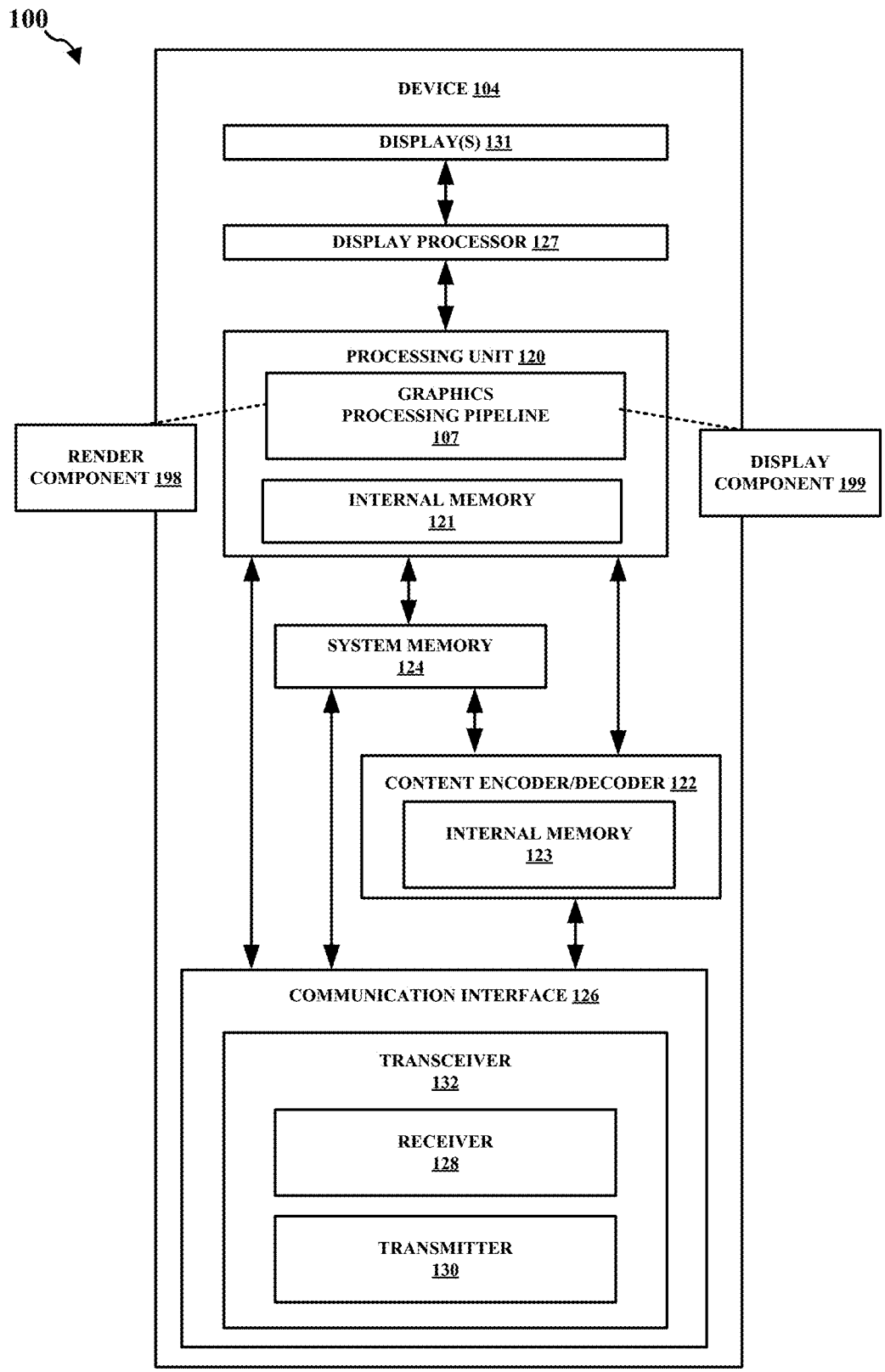
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a frame buffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before the frames are displayed by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a general purpose GPU (GPGPU), or any other processing unit that may be configured to perform graphics processing. The content encoder/decoder 122 may be a processing unit configured to perform content encoding or decoding. In some examples, the processing unit 120 and content encoder/decoder 122 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 and content encoder/decoder 122 may include one or more processors, such as one or more microprocessors, GPUs, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the processing unit 120 and content encoder/decoder 122 may store instructions for the software in a suitable, non-transitory computer-readable storage medium, e.g., internal memory 121 or internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a render component 198 configured to render at least one frame including display content. For example, the device 104 may be a server configured to render and communicate frames for display at a client device using split rendering. The render component 198 can also be configured to downscale the at least one frame including the display content, where a downscaling rate of one or more portions of the at least one frame can be based on a location of each of the one or more portions. The render component 198 can also be configured to communicate the downscaled at least one frame including the display content to the client device. The render component 198 can also be configured to determine the downscaling rate of the one or more portions of the at least one frame based on the location of each of the one or more portions. The render component 198 can also be configured to encode the downscaled at least one frame including the display content.

Referring again to FIG. 1, in certain aspects, the graphics processing pipeline 107 may include a display component 199 that is configured to receive at least one frame including display content. For example, the device 104 may be a client device configured to receive rendered frames from a server for display using split rendering. The received at least one frame can be encoded by another device, and the display component 199 can also be configured to decode the encoded at least one frame including the display content. The at least one frame can be downscaled by another device, and the display component 199 can also be configured to upscale the at least one frame including the display content, where an upscaling rate of one or more portions of the at least one frame can be based on a location of each of the one or more portions.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

In some aspects, the rendering of an image or frame can be performed in multiple locations and/or on multiple devices, e.g., in order to divide the rendering workload between different devices. For example, the rendering workload can be split between a server and a client device. In some aspects, this process can be referred to as "split rendering." In some instances, split rendering can be a method for bringing content to client devices or head mounted displays (HMDs), where a portion of the computer or graphics processing can be performed outside of the client device or HMD, e.g., at a server.

Split rendering can be performed for a number of different types of applications, e.g., virtual reality (VR) applications, augmented reality (AR) applications, and/or extended reality (XR) applications. In VR applications, the content displayed at the client device can correspond to rendered or animated content, e.g., content rendered at a server or client device. In AR or XR applications, a portion of the content displayed at the client device can correspond to real-world content, e.g., objects in the real world, and a portion of the content can be rendered or animated content. Also, the rendered or animated content and real-world content can be displayed in an optical see-through or a video see-through device, such that the user can view real-world objects and rendered content simultaneously. In some aspects, XR content can refer to, for example, VR content, AR content, and the like. XR, VR, and AR applications can all involve a user viewing rendered content through a headset.

Split rendering can provide a high quality user experience in XR, AR or VR applications by splitting the computational workload between a client or user device, e.g., a HMD or headset, and a server. In some aspects, the client device and the server can be connected to each other via a communication link, e.g., via 5G or Wi-Fi. Also, the server can be located in close proximity to the communication link, such that signal may be stronger in order to reduce latency. In some aspects, the server can be referred to as an edge server or a cloud server.

In some instances of XR, VR, and AR applications, a client device or headset can include a GPU or graphics processing device, which can perform the necessary computations or graphics processing for the rendered content. Utilizing split rendering can offload a significant portion of computations or graphics processing to a server. In these instances, the server can be any device that can perform some computations or graphics processing offloaded from the client device. For example, the server can be a cloud server, an edge server, a personal computer, a smart phone, or any appropriate device.

Figure 2:
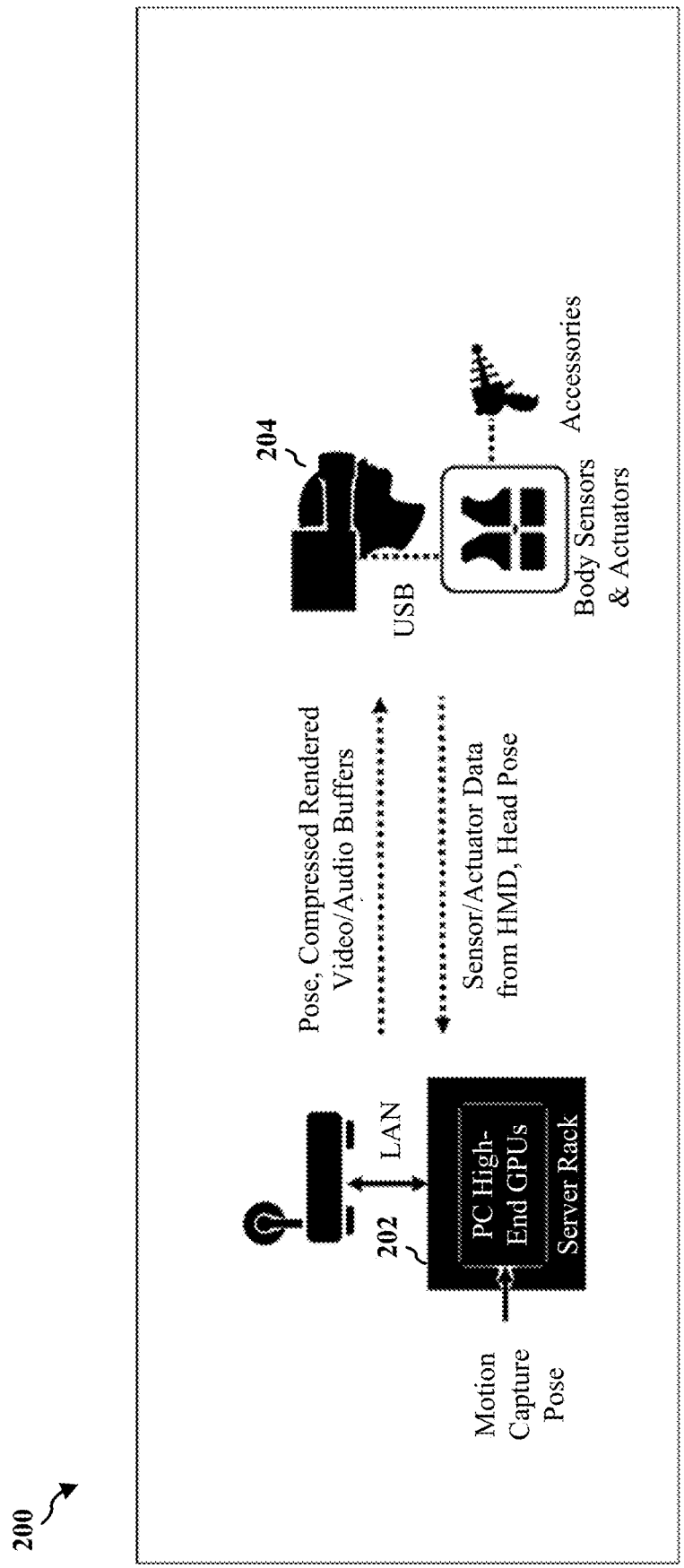
FIG. 2 illustrates an example diagram including a remote virtual reality (VR) system in accordance with one or more techniques of this disclosure.

FIG. 2 illustrates an example diagram 200 including a remote virtual reality (VR) system in accordance with one or more techniques of this disclosure. In remote VR, a rendering machine 202 can stream rendered frames to a remote client 204 for display. The rendering machine 202 can be a server including one or more GPUs. The remote client 204 can be a client device such as a HMD. The rendering machine 202 can communicate with the remote client 204 via a Wi-Fi, 5G, or other communication link. For example, rendering machine 202 can be connected via a local area network (LAN) to a Wi-Fi access point (AP) that enables communication between the rendering machine and remote client 204. Remote client 204 can also communicate with other devices than rendering machine 202. For example, remote client 204 can communicate with body sensors, actuators and accessories via Universal Serial Bus (USB) or other communication protocols.

The overall content pipeline can involve rendering, encoding, streaming, decoding, and/or re-projection for display. For example, rendering machine 202 can generate render buffers based on a motion capture pose received from remote client 204. Rendering machine 202 may then compress or encode the render buffers, e.g., video and audio buffers, and stream the render buffers to remote client 204. Remote client 204 then decodes the compressed render buffers and re-projects them for display. Remote client 204 can also warp previous frames or render buffers to align with updated motion capture poses. When sensors and actuators of remote client 204 identify an updated motion capture pose, remote client 204 communicates the sensor/actuator data including the updated motion capture pose to rendering machine 202 for updated rendering. The overall content pipeline thus repeats.

The different stages in a remote VR pipeline, e.g., work on texture data and per-stage performance, can depend on the texture dimensions. Current and future VR devices may need higher resolution displays, e.g., 2K×2K or greater, which puts a greater demand on the computations in each stage. The bandwidth specifications of the network connecting the server and client may also increase. Further, higher resolutions may lead to higher per-stage latency and round-trip times, e.g., motion-to-render-to-photon (m2r2p) latency, which may need to be minimal for a high quality VR experience.

Aspects of the present disclosure can downscale the high-resolution rendering texture, e.g., 2K×2K, to a lower resolution texture, e.g., 1.4K×1.4K, for encoding and streaming. This can be followed by decoding and upscaling back to high-resolution at the client side. This approach can exploit the fact that in VR higher quality content can be located in the central fovea with lower-quality content located along the periphery. Thus, by downscaling content in the central fovea, the present disclosure can achieve texture compression with negligible loss in visual quality. The aforementioned downscaling can be spatially non-uniform, i.e., higher quality can be preserved in a central fovea where the user is likely to focus and lower quality or higher downsampling can be applied to the periphery. At the client side, decoding of the downscaled texture can be followed by upscaling back to high resolution prior to display.

Figure 3:
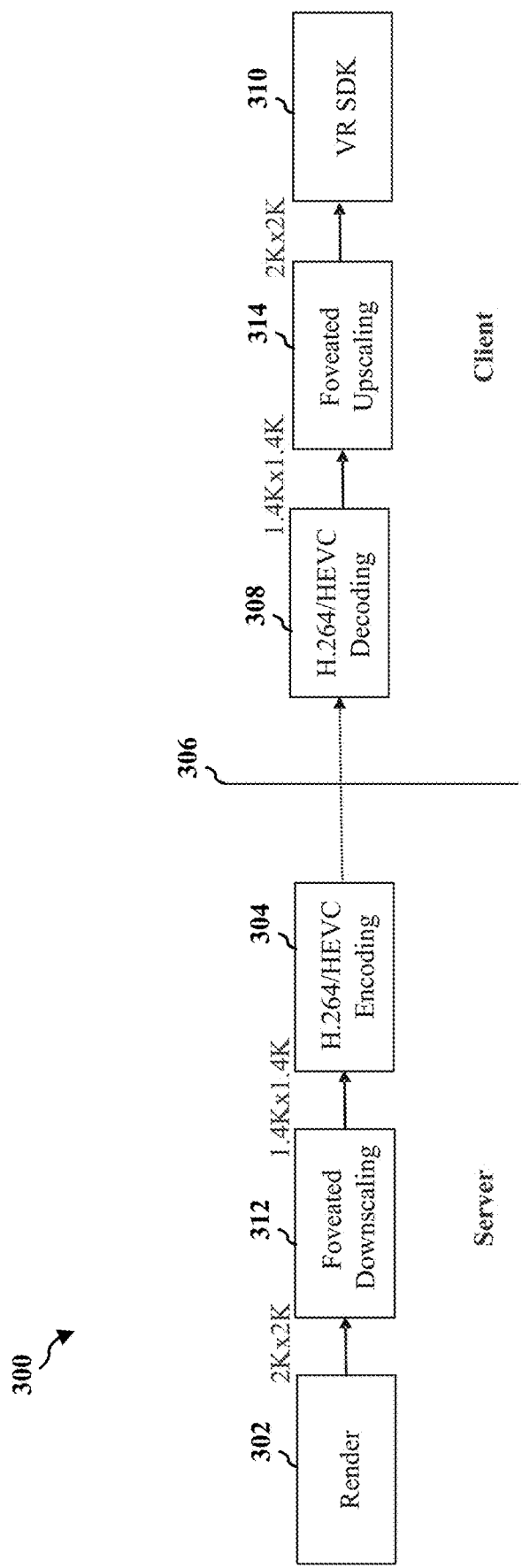
FIG. 3 illustrates an example diagram including communication between a client device and a server in accordance with one or more techniques of this disclosure.

FIG. 3 illustrates an example diagram 300 including communication between a client device and a server in accordance with one or more techniques of this disclosure. As described with respect to the remote VR pipeline of FIG. 2, the server may render a texture at 302, such as a 2K×2K texture, encode the texture at 304, and communicate the encoded texture to the client at 306. The client may decode the encoded texture at 308, and re-project the decoded texture for display at 310 using, for example, a VR software development kit (SDK). The foveated downscaling and upscaling boxes 312, 314 shown in FIG. 3 indicate the modifications to the remote VR pipeline, which together can be referred to as foveated compression. For example, rather than encoding and communicating a larger 2K×2K texture, the server can perform foveated downscaling at 312 to create a smaller 1.4K×1.4K texture, and encode and communicate that smaller texture at 304 and 306. Moreover, the client can perform foveated upscaling at 314 to re-create the larger 2K×2K texture for display. In some examples, the foveated compression can save roughly 10 ms in m2r2p latency compared to not using foveated compression, i.e., working on the 2K×2K textures directly.

Figure 4A:
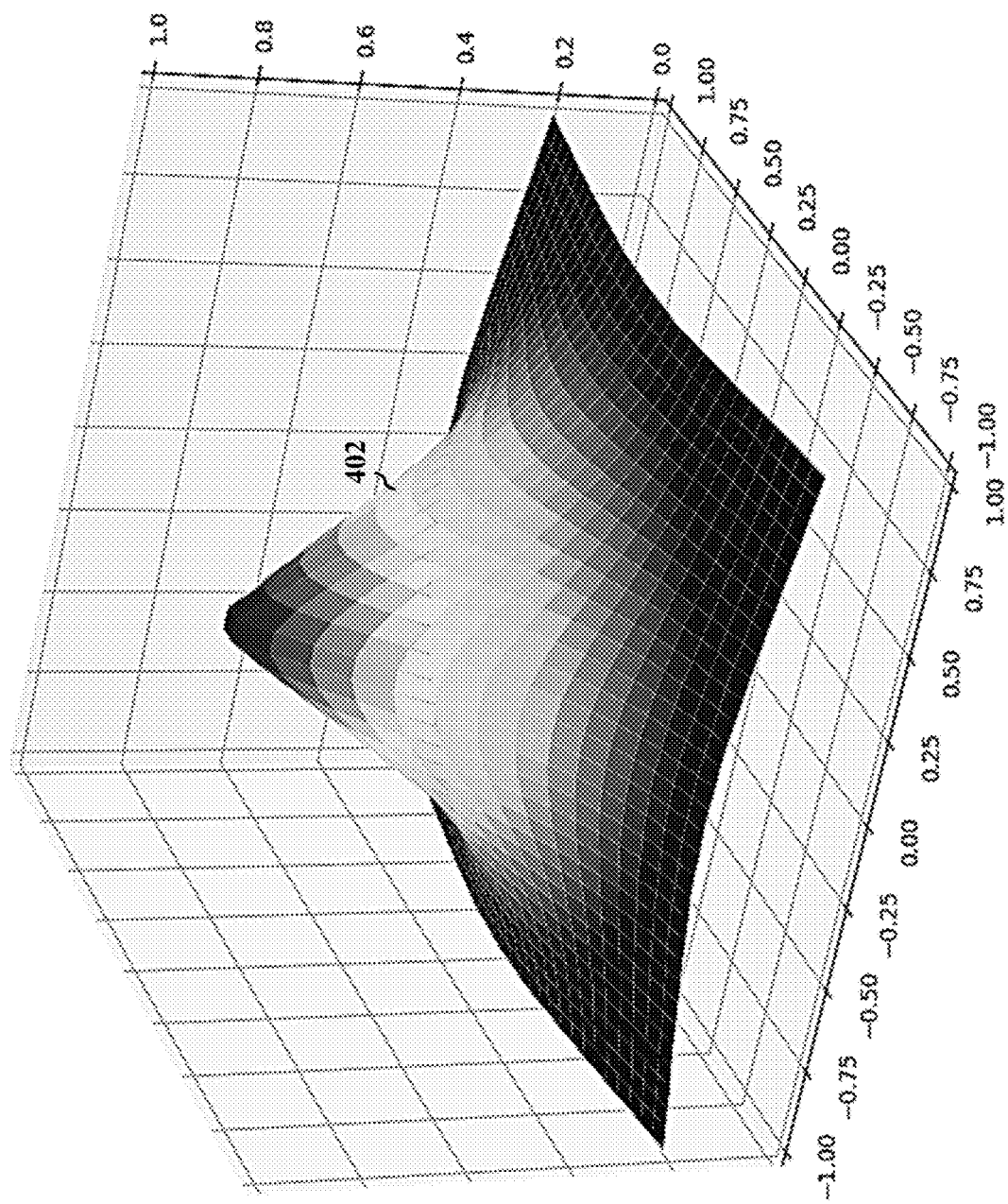
FIGS. 4A and 4B illustrate example diagrams of foveation transfer function plots for foveated compression in accordance with one or more techniques of this disclosure.
Figure 4B:
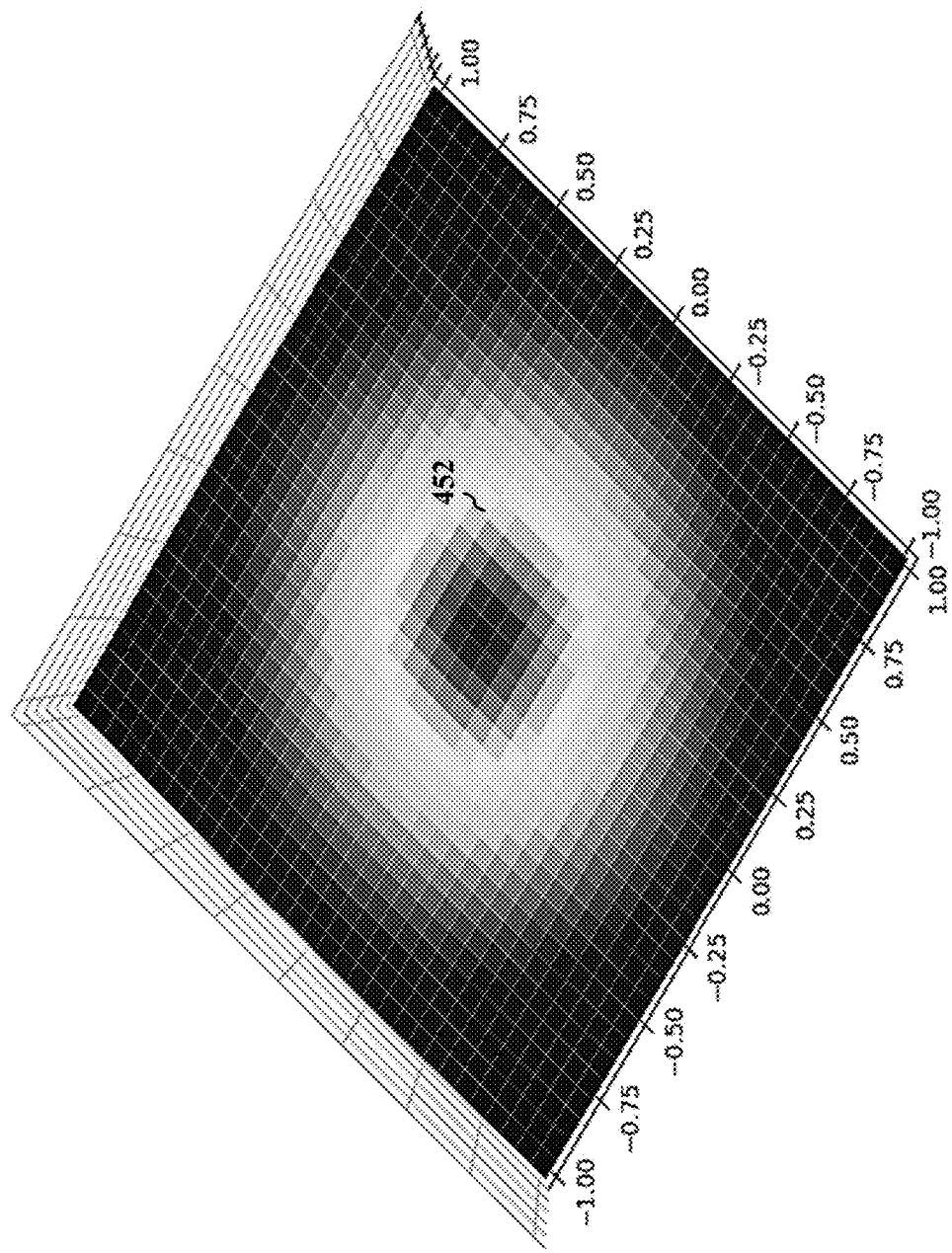

Some aspects of the present disclosure can indicate the density of sampling of the originally rendered texture as per a foveation transfer function. FIGS. 4A and 4B illustrate a plot 400, 450 of the foveation transfer function in a perspective and plan view, respectively. Here, the x, y axes can correspond to normalized coordinates in the width and height dimensions of the original image, while the z axis can correspond to a downscaling or compression factor. At the center of the plot, the downscaling can preserve pixels at a 1:1 ratio or downscaling rate, and the compression can increase (or the downscaling rate can decrease) towards the periphery of the plot. For instance, at the very edges of the plot, the downscaling can fully compress pixels at a 0:1 ratio or downscaling rate. The downscaling rate can change depending on the location of the pixels in the texture, with smaller downscaling rates at larger radii, as illustrated in FIGS. 4A and 4B. The downscaling rate at different locations of the texture can further decrease at locations outside a foveal region 402, 452, which radius may be configurable based on a selected fovea angle. For example, pixels at the center of a texture indicated by x-y coordinates (0,0) may not be downscaled and thus preserved at their original resolution or intensity, while pixels radially extending away from the center may be slightly downscaled or preserved without downscaling until the end of foveal region 402, 452. Outside the foveal region, the pixels are increasingly downscaled towards the peripheral xy coordinates (−1, −1), (−1, 1), (1, −1), (1, 1), at which point the pixels are completely downscaled to very low resolution or zero intensity.

Some aspects of foveated compression can include 2K×2K input, which can be downscaled to 1.4K×1.4K and upscaled back to 2K×2K. FIG. 5 illustrates an example 500 of foveated compression based on a selected fovea angle of 40 degrees. An originally rendered eye-buffer 502 is downscaled at a server to a compressed output 504 based on the foveation transfer function. For example, assuming the originally rendered eye-buffer 502 has a field of view of 90 degrees (corresponding to a user's eye's field of view), a 16×16 vertex grid may be applied to the originally rendered eye-buffer to result in compressed output 504. The compressed output 504 may include downsampling corresponding to the foveation transfer function plots 400, 450 of FIGS. 4A and 4B with higher resolution in a selected fovea region, e.g., based on the fovea angle of 40 degrees. Therefore, the pixels can match the original texture 1:1 at the center, while the original texture may appear "pulled in" at the periphery, as illustrated in FIG. 5. After the compressed output 504 is communicated from the server to the client, the client decompresses or upscales the compressed output to result in decompressed output 506. The upscaling may be similarly performed based on the foveation transfer function. For example, the upscaling rates can match the downscaling rates at the same locations shown in foveation transfer function plots 400, 450.

Referring again to the foveation transfer function plots of FIGS. 4A and 4B, in some aspects, an example foveation function can defined as $$f(\text{radius; gain, factor}) = \frac{1}{\max((\text{gain} * \text{radius})^2 - \text{factor}, 1)}.$$

Here, for any (x, y) in the normalized coordinate spaces, $x^2 + y^2 = \text{radius}^2$ and $f(\ )$ is the downsampling factor in the locality of the point (x, y) in the original texture. This example of a foveation function can define a disc around the center of the texture where no or less downsampling is done (e.g., within foveal region 402, 452), and the downsampling ratio can decrease quadratically with a radius outside this disc. It can be shown that the foveal disk can have a radius $$r_{fovea} = \frac{\text{sqrt}(1 + \text{factor})}{\text{gain}}.$$

Given a round trip delay for displaying an updated motion capture pose such as a m2r2p latency, and a nominal amount of head motion during this time, aspects of the present disclosure can determine the size of the aforementioned disc, e.g., this size can be set to be the equivalent of 40 degrees of field of view. Beyond this disc size, the fall off of the foveation curve shown in FIG. 4A can be such that a desired amount of compression is achieved. For example, after the foveal disc has been determined, the slope of the parabolic fall off past foveal region 402, 452 in FIG. 4A may further be determined to identify the downscaling rates that can be used to compress a 2K×2K texture to 1.4K×1.4K. The two constraints (e.g., the fovea angle and the slope of the parabolic fall off) together determine the gain and factor parameters in the foveation transfer function. Thus, the factor and gain are interrelated with the radius.

While this example assumes the foveal region 402, 452 is set based on a 40 degree fovea angle and a compression ratio of 2K×2K to 1.4K×1.4K, the size of the foveal region (and thus the downscaling/upscaling rate or output of the foveation transfer function) may be set differently based on the round trip delay for displaying an updated motion capture pose and may change for other desired compression ratios. For example, a server or client may determine to select larger fovea angles (above 40 degrees) for downscaling/upscaling in cases with larger m2r2p latencies and to select smaller fovea angles (below 40 degrees) for downscaling/upscaling in cases with smaller m2r2p latencies. Similarly, a server or client may determine to change the parameters of the foveation transfer function to result in larger downscaling/upscaling rates (less compression) outside the foveal transfer region 402, 452 in cases with larger compression ratios (e.g., 2K×2K to 1.8K×1.8K) and to result in smaller downscaling/upscaling rates (more compression) outside the foveal transfer region in cases with smaller compression ratios (e.g., 2K×2K to 1K×1K).

Figure 6A:
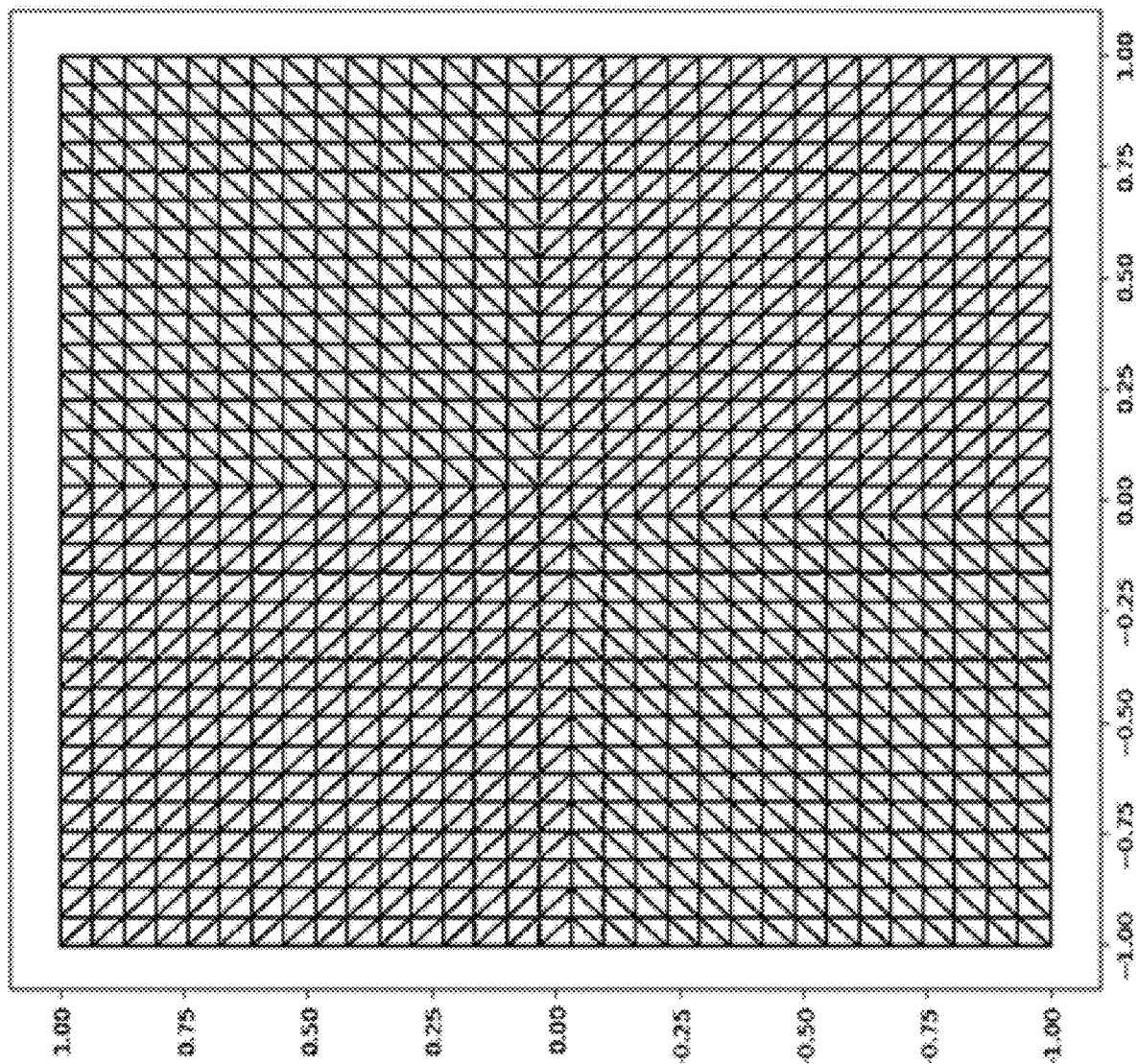
FIGS. 6A and 6B illustrate example diagrams of vertex grids for foveated compression in accordance with one or more techniques of this disclosure.
Figure 6B:
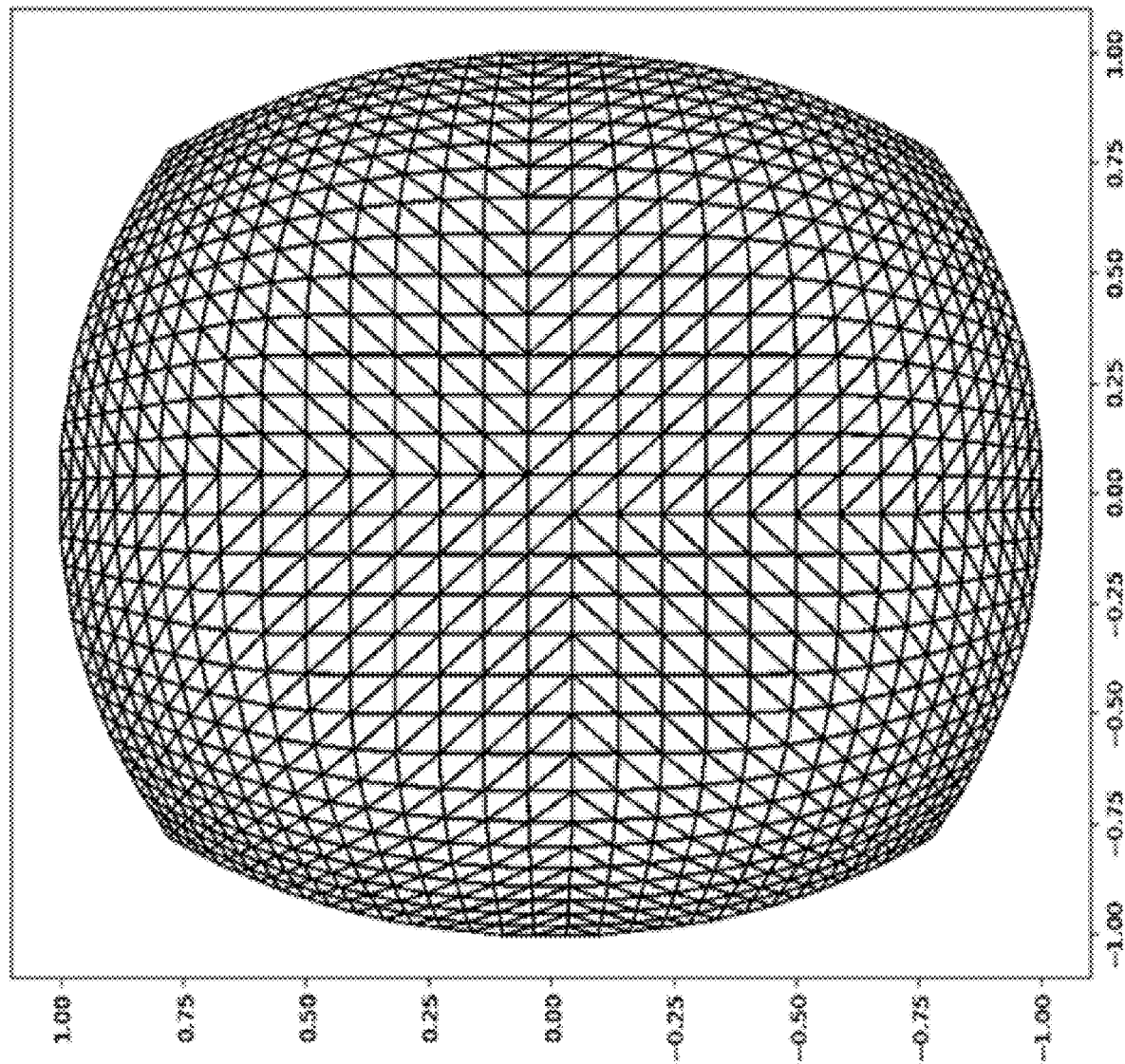

Also, there can be mapping between uniformly spaced vertices in the original texture space and corresponding vertices in the downsampled textures space. FIG. 6A illustrates an example of an original vertex grid or original mesh 600 that includes uniformly spaced vertices which may be applied to render a frame without foveated compression, while FIG. 6B illustrates an example of a foveated vertex grid or foveated mesh 650 that includes corresponding vertices which may be applied to render a frame with foveated compression. This mapping can be determined based on the foveation function f( ). For example, referring to FIGS. 4A and 4B, the mapping of vertices in original mesh 600 to corresponding vertices in foveated mesh 650 may be based on a fovea angle of 40 degrees corresponding to foveal region 402, 452 with downsampling rates as illustrated in the foveation transfer function plots of FIGS. 4A and 4B. This mapping can represent the input to a vertex shader and be used to perform downsampling. For example, referring to FIG. 5, the server may include a vertex shader that applies foveated mesh 650 to originally rendered eye-buffer 502 to create compressed output 504.

Figure 7:
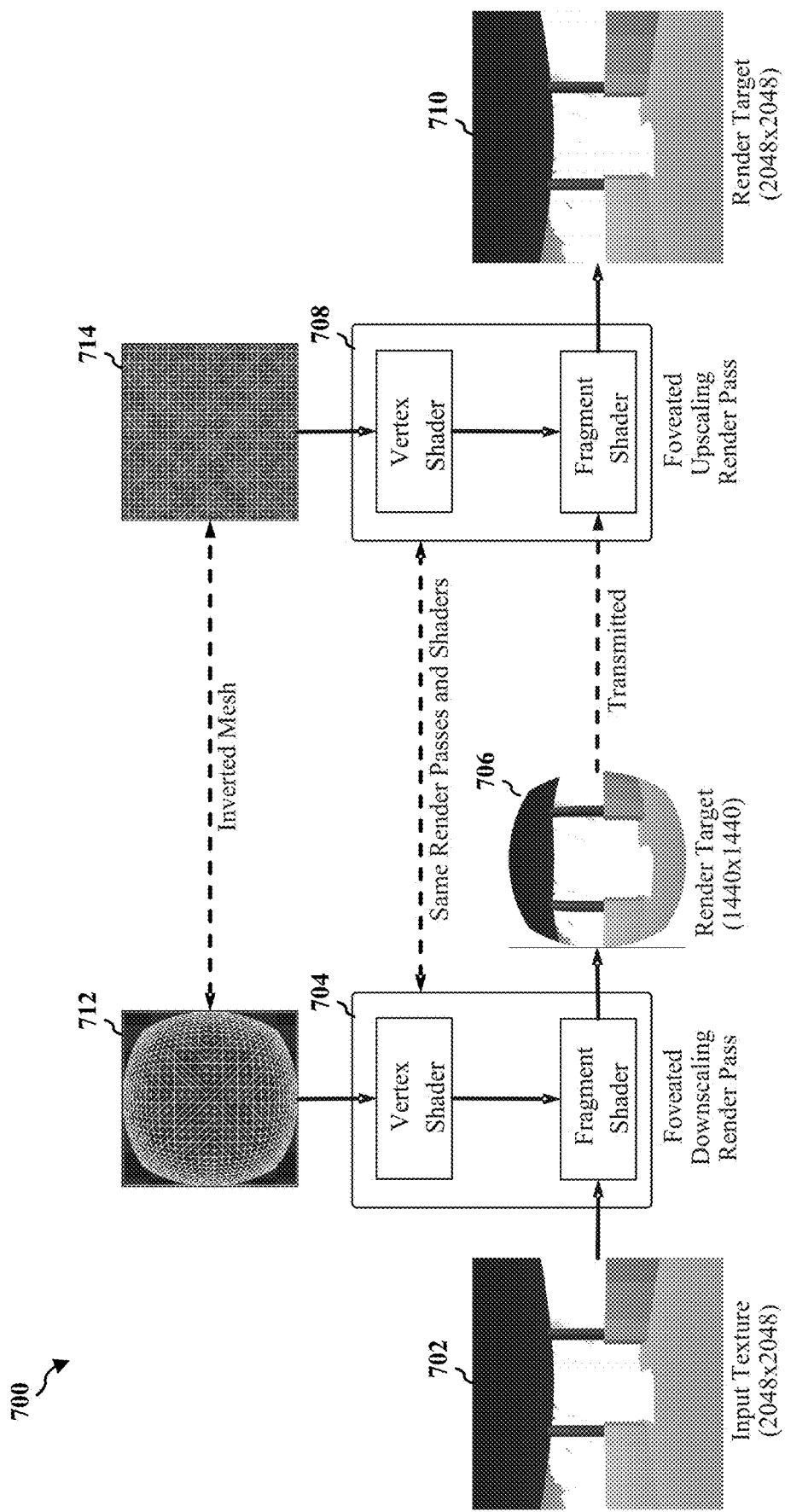
FIG. 7 illustrates an example diagram including foveated compression in accordance with one or more techniques of this disclosure.

FIG. 7 illustrates an example diagram 700 including foveated compression in accordance with one or more techniques of this disclosure. Diagram 700 displays an input texture 702, a foveated downscaling render pass 704, a render target 706, a foveated upscaling render pass 708, and another render target 710. For example, referring to FIGS. 4-6, input texture 702 may correspond to originally rendered eye-buffer 502 (2K×2K), render target 706 may correspond to compressed output 504 (1.4K×1.4K), and render target 710 may correspond to decompressed output 506 (2K×2K). During the foveated downscaling render pass 704, a server may apply a foveated mesh 712 (corresponding to foveated mesh 650) to the input texture using a vertex shader and fragment shader to create render target 706. The server may communicate the downscaled, render target 706 to the client. During the foveated upscaling render pass 708, the client applies an inverted mesh 714 (corresponding to an inversion of foveated mesh 650) to the compressed texture using another vertex shader and fragment shader to create render target 710.

In some embodiments of foveated compression, render passes and shaders can be the same on server-side (downscaling) and client-side (upscaling). For example, foveated downscaling render pass 704 and foveated upscaling render pass 708 may include vertex and fragment shaders that operate to create render targets in a similar manner. However, the inputs may differ, e.g., the vertex buffer (mesh) (e.g., foveated mesh 712 vs. inverted mesh 714) and texture. For instance, downscaling can use the 2K×2K texture (e.g., input texture 702), while upscaling can use the 1.4K×1.4K texture (e.g., render target 706).

For both foveated downscaling and upscaling, the render pass can be a simple graphics pipeline with a vertex and fragment shader. The vertex shader can be a pass-through for the corresponding vertex grid while the fragment shader merely performs texture sampling of the corresponding texture. The vertex shader can pass a position (x,y) and texture coordinate (u,v) to the fragment shader, with both attributes in a normalized space [−1, 1]. For example, the position coordinates (x,y), texture coordinates (u,v), and normalized space [−1, 1] can correspond to the coordinates and space illustrated in the foveation transfer function plots 400, 450. In one example, the texture coordinates (u,v) may correspond directly to the position coordinates (x,y) in the normalized space [−1, 1], and thus there can be an identical coordinate mapping between x and u and between y and v. In another example, the texture coordinates (u,v) can be in a different space [0, 1], and the position coordinates in the normalized space can be mapped to the texture coordinates in the different space. For instance, center position coordinate (0, 0) in the foveation transfer function plot 400, 450 can be mapped to texture coordinate (0.5, 0.5) in the different space.

In some aspects, the same vertex buffer (e.g., foveated mesh 650) can be used by both render passes, except that the upscaling uses the inverted form, i.e., position and texture coordinates attributes are interchanged. For example, foveated mesh 712 can be applied to original position coordinates represented by [x, y] in space [−1, 1] and texture coordinates represented by [u, v] in space [0, 1], while inverted mesh 714 can be applied to inverted position coordinates represented by [u, v] in space [0, 1] and inverted texture coordinates represented by [x, y] in space [−1, 1]. This interchanging can work as both attributes are in the same range or space [−1, 1] (since [0,1] still falls within the overall range [−1, 1]). Hence, the fragment shader may have to convert the texture coordinate (texcoord u,v) from [−1, 1] to [0, 1] range. In contrast, the z coordinate of the foveation transfer function plot 400, 450 remains the same before and after inversion of the position and texture coordinates, and therefore the downscaling rates represented at the different locations of foveated mesh 712 are the same as the upscaling rates represented at the different locations of inverted mesh 714. So upscaling effectively performs the inverse of downscaling.

Meshes are plain vertex buffers that can be directly used by the vertex shader in a single draw call per remote VR pipeline run. Thus, the number of mesh triangles (see, e.g., triangles in FIGS. 6A and 6B) can determine the number of primitives (triangles) in the draw call. The meshes can be triangulated via vertex repetition as the draw call accepts a triangle list. Furthermore, the vertex ordering of triangles in the upper-right (quad I) and bottom-left (quad III) of the mesh can be flipped so the triangles are symmetric about the vertical and horizontal axes (see, e.g., FIGS. 6A and 6B). This can eliminate thin triangles and promotes uniform rasterization results about the axes.

Meshes can be generated dynamically at runtime during initialization by both the server-side (downscaling) and client-side (upscaling). Upscaling can additionally invert the mesh by interchanging the position and texcoord attributes used for downscaling. Dynamic mesh generation can be based on user configurable parameters such as the input/output texture dimensions, mesh dimensions, field-of-view, or fovea angle. For example, while a rendering server may dynamically generate the foveated mesh 712 (and similarly a remote client may dynamically generate the inverted mesh 714) illustrated in FIG. 7 based on the 2K×2K input texture, 1.4K×1.4K render target, 16×16 vertex grid, 90 degree field of view, and 40 degree fovea angle, rendering server and remote client may alternatively generate different meshes 712, 714 based on different texture dimensions, vertex grid dimensions, field of views, and fovea angles.

In some aspects, a system (e.g., a rendering server) can send a high resolution texture in a bandwidth constrained setting by downscaling the texture such that the original resolution can be preserved in the foveal region. As such, the foveal region can be fixed across time. For example, a rendering server may dynamically generate foveated mesh 712 and a remote client may dynamically generate inverted mesh 714 based on a 40 degree fovea angle for a period of time, before dynamically generating new meshes. Thus, the downscaling rate and upscaling rate applied at various locations of a rendered frame may remain fixed for the period of time. In some aspects, the foveal region can vary in response to network constraints, such that the foveal region may be larger when the network connection is strong and smaller when the network connection is weak. For example, a rendering server may dynamically change the foveated mesh 712 and a remote client may dynamically change the inverted mesh 714 depending on a network connection strength or quality of service (QoS) between the rendering server and the remote client. Thus, the downscaling rate and upscaling rate applied at various locations of a rendered frame may change depending on the QoS. The foveal region can also be determined by eye-tracking. For example, if an updated motion capture pose reflects eye movement to a periphery of a current frame, the remote client (and the rendering server) may dynamically change the foveated mesh 712 and inverted mesh 714 such that the foveal region 402, 452 is centered around the new focus of the eye. Thus, the various locations of a rendered frame at which the downscaling and upscaling rates are applied may change depending on eye-tracking.

In this system, the downscaling function can be dependent on roundtrip delay and compression ratio. For example, as described above, the size of the foveal region (and thus the downscaling/upscaling rate or output of the foveation transfer function) may be set differently based on the round trip delay for displaying an updated motion capture pose and may change for other desired compression ratios. For example, a server or client may determine to select larger fovea angles (above 40 degrees) for downscaling/upscaling in cases with larger m2r2p latencies and to select smaller fovea angles (below 40 degrees) for downscaling/upscaling in cases with smaller m2r2p latencies. Similarly, a server or client may determine to change the parameters of the foveation transfer function to result in larger downscaling/upscaling rates (less compression) outside the foveal transfer region 402, 452 in cases with larger compression ratios (e.g., 2K×2K to 1.8K×1.8K) and to result in smaller downscaling/upscaling rates (more compression) outside the foveal transfer region in cases with smaller compression ratios (e.g., 2K×2K to 1K×1K).

A system can additionally use foveated rendering to render at varied resolutions across the eye-buffer texture such that the resolution matches the downsampling function used in a later foveated encoding stage. For example, the rendering server may render input texture 702 at a higher resolution within foveal region 402, 452 (e.g., every pixel) and at a lower resolution outside foveal region 402, 452 (e.g., every other pixel, every one of four adjacent pixels, or other alternating arrangements). Such foveated rendering may thus be aligned with foveated compression, since locations of the texture at lower resolutions outside the foveal region may be downsampled while locations of the texture at higher resolutions within the foveal region may be preserved. This approach may also reduce round trip delays or m2r2p latencies by providing more efficient rendering, since less time may be used to render different locations of the input texture at lower resolutions than to inefficiently render the entire texture at high resolution including locations outside the foveal region.

Aspects of the present disclosure can also utilize foveated compression and adaptive streaming. In some instances, the split VR system may be realized over a mobile network, e.g., a 5G network. In such a network, the available throughput to a user may be limited. For instance, the operator may be interested in maximizing number of users which means lesser throughput per user. Also, a user's throughput may depend on where they are in a network cell and other interference in the area. Further, a user's throughput may change over time as a number of active users change and as the user moves.

Foveated compression can provide a knob to adapt the bit-rate needed to send visuals on a client's downlink, such that the bit-rate is higher when the network connection is strong and lower when the network connection is weak. The available instantaneous throughput can be determined based on the client's interaction with the network, and communicated to the server. The server can target an encoding bit-rate based on the available network throughput. Based on the encoding bit-rate the server can determine the amount of spatial downscaling that foveated compression needs to achieve. The parameters of the foveation curve can be determined to achieve the necessary level of downscaling, and also communicated to the client. The mesh for foveated compression/decompression can be re-generated at the server/client based on the computed parameters.

In some aspects, since foveated compression can also reduce encode/decode latencies, it can be used as a knob to reduce overall end-to-end latency as well. If the network connection between server and the client device is weak or the uplink/downlink latencies are high, foveated compression can be used to balance some of this out with a reduced encode/decode time.

Aspects of the present disclosure can also utilize asynchronous time-warp (ATW). In a split VR system, the user can move and their pose can be estimated by the client HMD, e.g., at a 500 Hz rate. The pose can be transmitted to the server, e.g., at the same rate as the estimation. The game engine on the server can select the latest pose available when it is ready to render the frame. The game engine can render the frame for the chosen user pose and the visual/eye-buffer can be encoded. Also, the rendered frame may be downscaled prior to encoding using a standard encoder. The eye-buffer can then be transmitted over the downlink to the client and the packets can be reassembled therein. The eye-buffer can be decoded and also upscaled.

In some aspects, the overall time from when a user moves to when the corresponding frame is decoded can be in the order of 50 ms. However, in some instances, latencies more than 20 ms from motion to corresponding display update can make a user uncomfortable. Split VR systems can use time-warp to mitigate the effect of round-trip latency. The time-warp thread can run synchronously with the display refresh on the client HMD and asynchronously with the decoder. Prior to displaying a new frame, this thread can select the last decoded frame, e.g., that was rendered for a user pose that may be 50 ms old, and warp it to the latest user pose. In some aspects, the warp can be a frame rotation/homography based on the difference between the latest pose and the render pose. The perception system can be tricked into thinking the viewed frame is rendered very recently.

Figure 8:
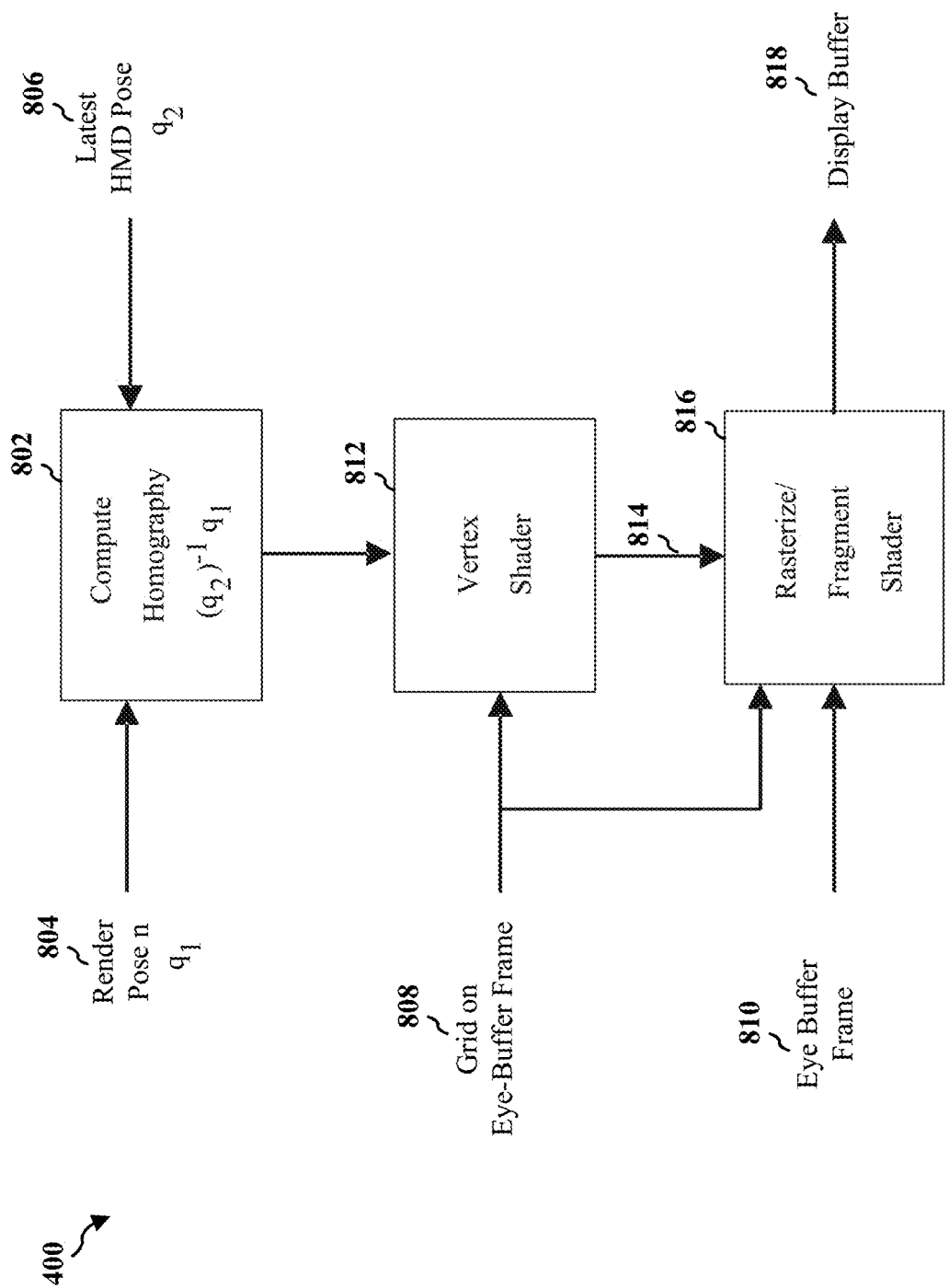
FIG. 8 illustrates an example diagram including time warp in accordance with one or more techniques of this disclosure.

FIG. 8 illustrates an example 800 of an aspect of ATW implementation at a client device. In this example, a warping matrix or homography can be calculated at 802 based on the difference between a render pose 804 (e.g. originally rendered eye-buffer 502) and a latest sampled pose 806 prior to display (e.g. a previous rendered eye-buffer). A grid 808 of points, e.g., a uniform grid such as original mesh 600, may be overlaid on a decoded eye-buffer frame 810. A vertex shader 812 can apply the homography to the points on the grid 808, e.g., to create a second grid 814 that indicates where the points in the original grid map in the displayed frame. A fragment shader can take both grids, i.e., the mapping, and the actual eye-buffer frame and at 816 paint out a display buffer 818 or the frame to be displayed.

Aspects of the present disclosure can also utilize foveated compression and ATW. As described so far, foveated upscaling can occur as a separate step prior to a time-warp. However, both time-warp and foveated upscaling can involve a vertex and fragment shader. These two operations can be combined to produce foveated compression and ATW.

Figure 9:
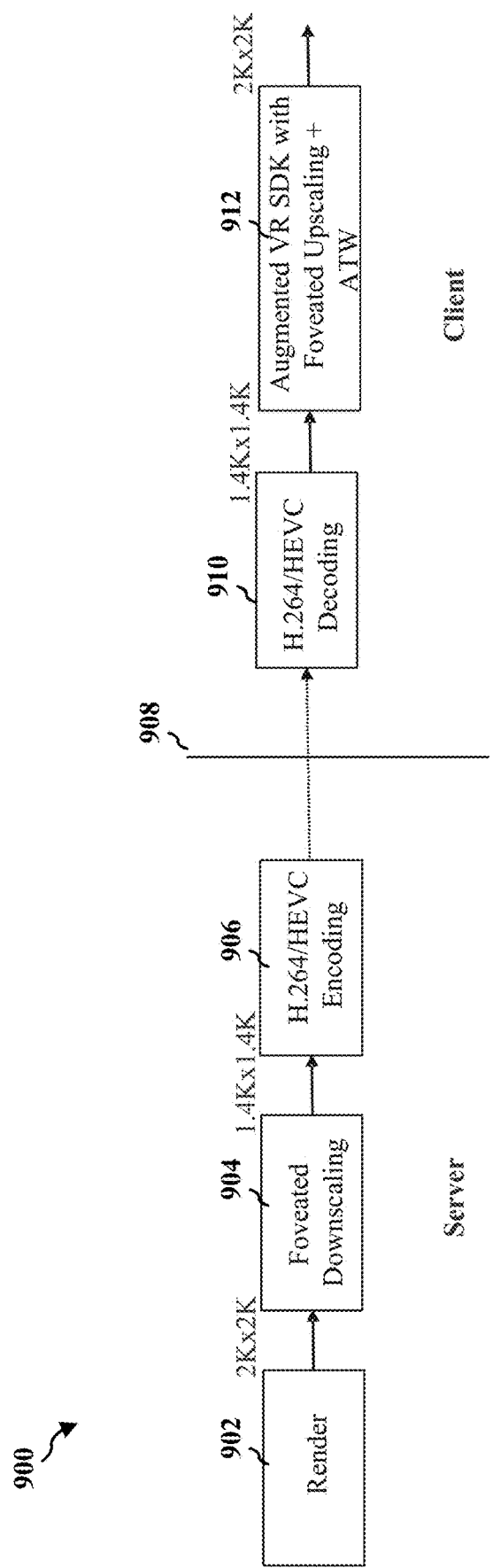
FIG. 9 illustrates an example diagram including communication between a client device and a server in accordance with one or more techniques of this disclosure.

FIG. 9 illustrates an example diagram 900 including communication between a client device and a server in accordance with one or more techniques of this disclosure. As described with respect to FIGS. 3-7, the server may render a texture at 902, perform foveated downscaling at 904, encode the texture at 906, and communicate the encoded texture to the client at 908. The client may decode the encoded texture at 910, and perform foveated upscaling with ATW and re-project the decoded texture for display at 912 using, for example, an augmented VR SDK.

Figure 10:
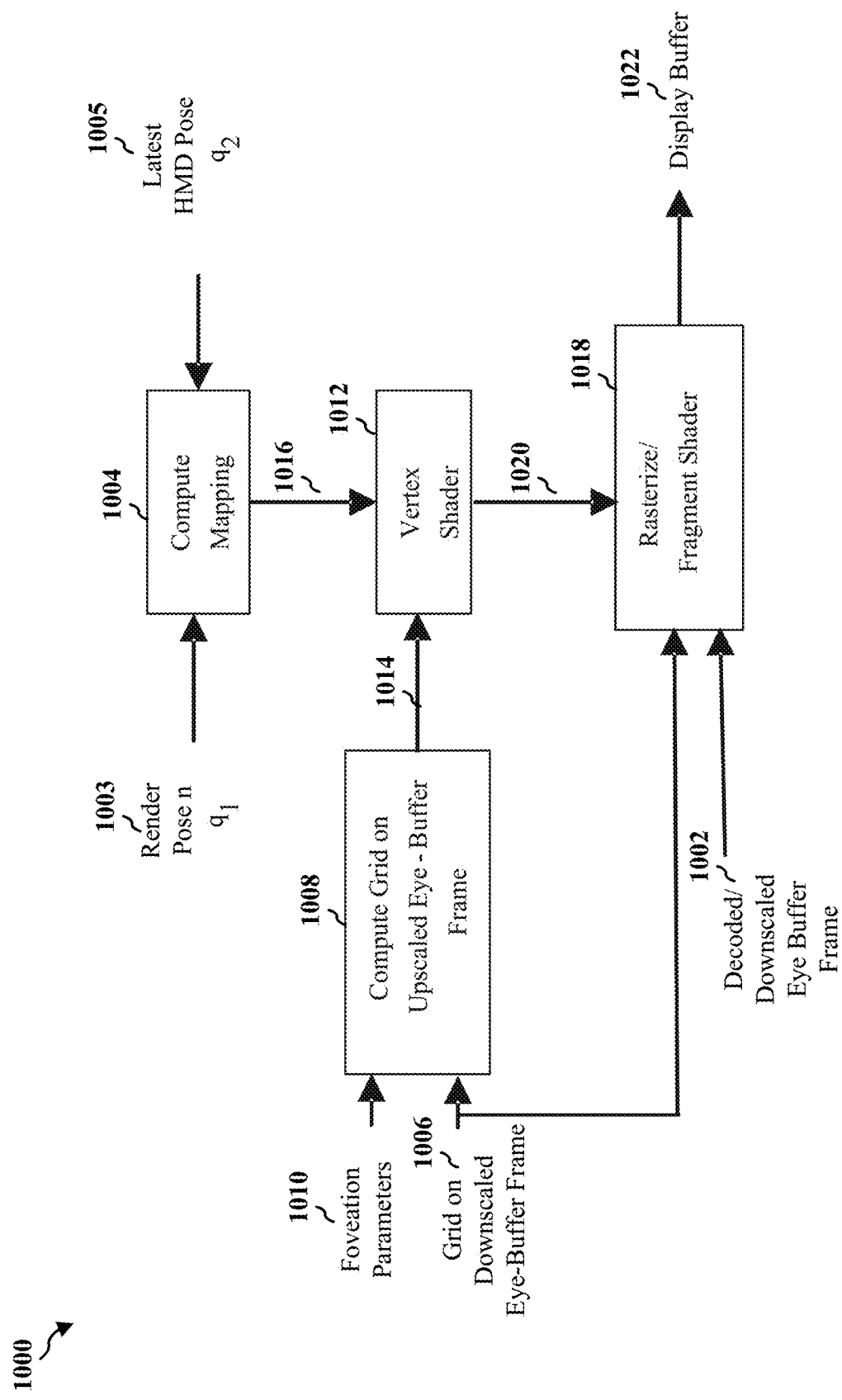
FIG. 10 illustrates an example diagram including time warp and foveated compression in accordance with one or more techniques of this disclosure.

FIG. 10 illustrates an example 1000 of an aspect of foveated decompression and ATW implemented at a client device. In some aspects, the client can decode an eye-buffer frame 1002 that may have been downscaled at the server using foveated downscaling, as described above. At 1004, the client VR SDK can compute (based on a render pose 1003 and a latest sampled pose 1005 prior to display) a mapping of vertices on a grid 1006 overlaid on the downscaled image and at 1008 compute a grid overlaid on a corresponding upscaled frame using foveation parameters 1010 (e.g., radius or other parameters of the foveation transfer function described above). A vertex shader 1012 can take this second grid 1014 and apply the time-warp homography 1016 computed at 1004 on top of this grid. At 1018, a fragment shader can also take the original grid 1006, the final time-warped grid 1020, and the downscaled eye-buffer frame 1002 and output a display buffer 1022 (e.g., the frame to be displayed).

Aspects of the present disclosure can also utilize video error concealment. In a split VR system, packet losses can be expected as the link between the server and client device may be wireless; error concealment may be used to mitigate such packet loss, i.e., where older decoded information (e.g., stock concealed pixels) is used to fill in losses in a current frame. In VR, changes in video content can be strongly correlated with evolution of the viewer pose. Aspects of the present disclosure can repurpose time-warp for concealment, such that a lost slice in the current decoded frame is concealed with the collocated portion in a warped version of the previous frame. The warp here can account for a pose difference between consecutive rendered/decoded frames. The output of the concealment can be the eye-buffer that can be used by the VR SDK. In some aspects, this output can be further re-warped to the latest head pose prior to display.

Figure 11:
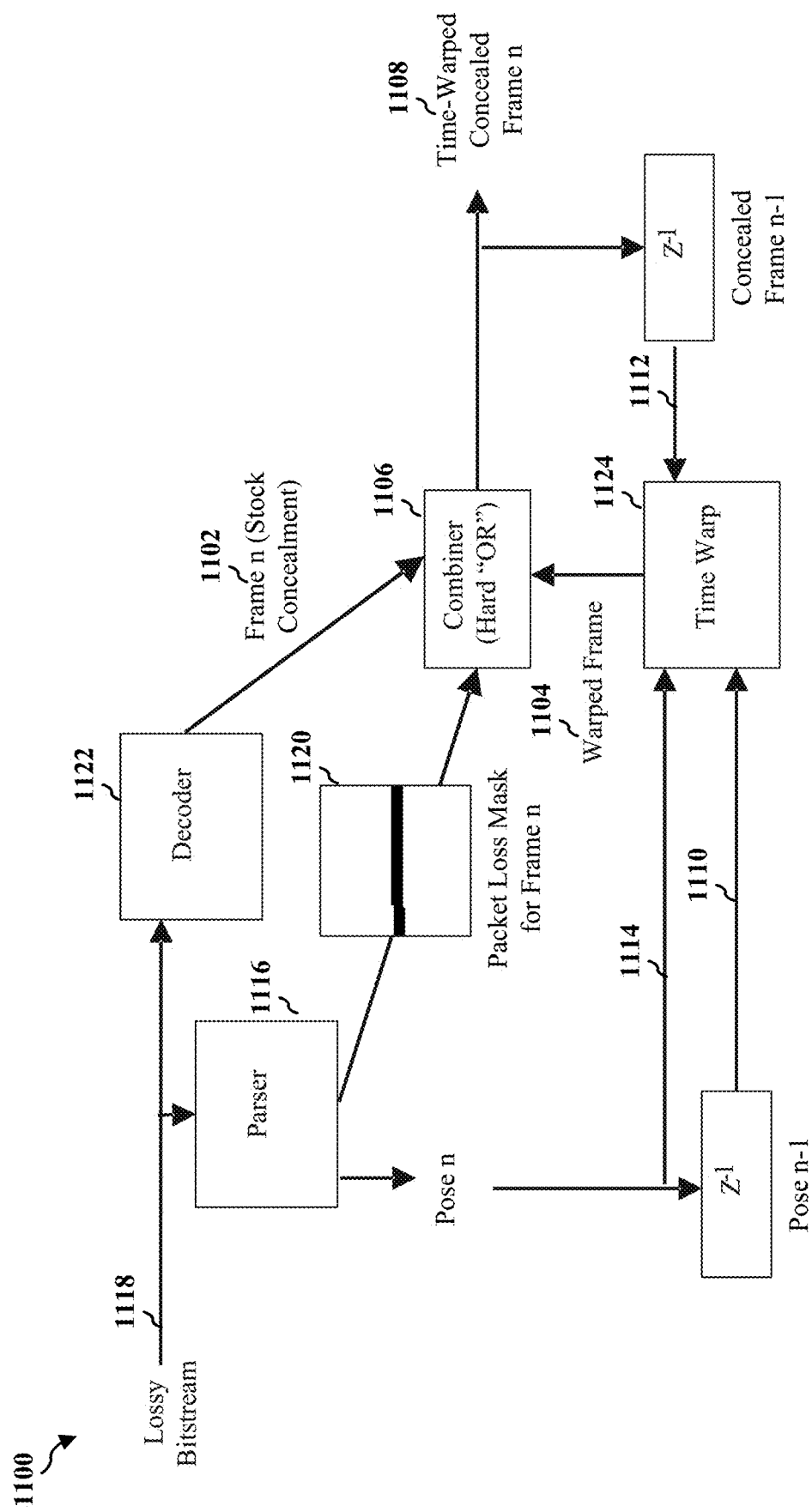
FIG. 11 illustrates an example diagram including time warp-based error concealment in accordance with one or more techniques of this disclosure.

FIG. 11 illustrates an example of an aspect of time-warp (TW) based video error concealment at a client device. In time-warp based video error concealment, two reconstructions (e.g. a stock concealed frame n 1102 and a time-warped frame 1104) can be combined by a combiner 1106, such that the stock concealed pixels in the lost regions are replaced with the pixels from the warped image. In some aspects, the combination of the two frames can be the TW concealed version of frame n (e.g., TW concealed frame n 1108). The warped frame may be a warped version of a previous frame (e.g., a previous frame 1110 without missing slices, or a previous concealed frame 1112 that had missing slices) to match a pose n 1114 in a current frame. A parser 1116 running on a CPU of the client device may parse a bitstream 1118 received from a rendering server for the pose n 1114. The parser 1116 can also produce a packet loss mask 1120 for frame n, which the combiner 1106 can use to arrive at the TW concealed frame n 1108.

For example, a decoder 1122 of the client device can decode frame n 1102 from bitstream 1118, and the warping and combining can be a post-process of the decoded output on a GPU of the client device. The received slices can also be decoded. The output of decoder 1122 can be a frame (e.g., stock concealed frame n 1102) that has stock concealment of any potentially lost slices. This can be a first approximation of the latest frame n. In some aspects, the present disclosure can also produce a second approximation of frame n at 1124, by time-warping frame n−1 to the render pose for frame n. Note that one render pose (n−1) is warped to another render pose (n), i.e., a repurposed time-warp. The TW concealed frame n−1 goes into producing frame n. Additionally, each video slice can be encapsulated in a real-time transport protocol (RTP) packet. The RTP header for each packet can contain a rendering pose and the size (in macroblocks) of the slice.

Figure 12:
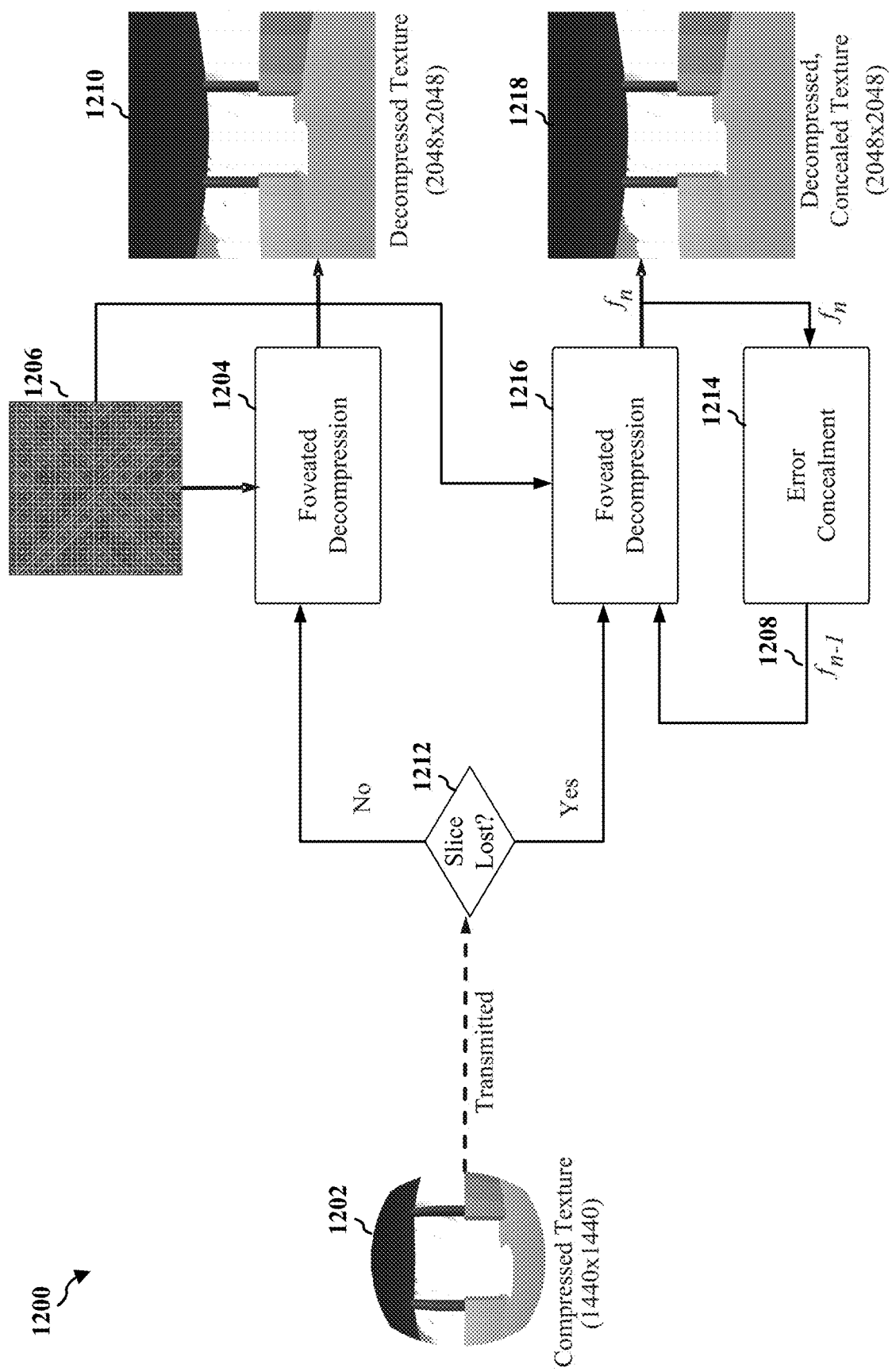
FIG. 12 illustrates an example diagram including time warp-based error concealment and foveated compression in accordance with one or more techniques of this disclosure.

Aspects of the present disclosure can also utilize concealment plus foveated compression. FIG. 12 illustrates an example 1200 where a compressed texture 1202 (e.g., 1.4K× 1.4K) is upscaled at a client device using foveated decompression 1204 based on an inverted mesh 1206, and where missing slices of the compressed texture 1202 are concealed using corresponding portions of a previous time-warped frame 1208 to create a decompressed texture 1210 (e.g., upscaled to 2K×2K). Compressed texture 1202 may correspond to render target 706, foveated decompression 1204 may correspond to foveated upscaling render pass 708 (including a fragment shader and vertex shader), inverted mesh 1206 may correspond to inverted mesh 714, and decompressed texture 1210 may correspond to render target 710 of FIG. 7. Moreover, previous time-warped frame 1208 may correspond to time-warped frame 1104 of FIG. 11.

After the client device receives compressed texture 1202 from a rendering server, the client determines at 1212 whether a slice is lost from the compressed texture 1202. For example, if some packets including rendered data are lost on the network, the compressed texture 1202 received at the client may have a missing slice region. If no slices are lost, the client device performs foveated decompression 1204 to arrive at decompressed texture 1210 such as described above with respect to FIG. 7. Otherwise, if slices are lost, the client device performs error concealment 1214 on the compressed texture 1202 using the previous time-warped frame 1208, such as described with respect to FIG. 11. The client device may warp the previous frame to appropriately align with the current frame including compressed texture 1202, since a user of the client device may have moved their head since the previous frame. As a user may potentially move faster than an image can be rendered, warping the previous frame to align with the user's expected visual will prevent an undesired lag effect, thereby preventing loss of immersion, motion sickness, or other similar effects. After filling in the missing slice region in the current frame using the previous time-warped frame 1208, the client device may similarly perform foveated decompression 1216 as described above to arrive at decompressed concealed texture 1218.

As mentioned previously with respect to FIG. 8, without a time-warp based concealment, the decoded frames may be subjected to ATW prior to display. Also as described with respect to FIG. 11, with a time-warp based concealment, losses in the decoded frame can be first filled up with the aforementioned concealment methods. The concealed frames can be subjected to ATW prior to display (e.g., as time-warped concealed frame n 1108). In some aspects, the decoded output may include foveated downscaling, such as described with respect to FIG. 7. This output can be inverted at the client via corresponding upscaling, such as also described with respect to FIG. 7. The upscaled frame can also be displayed with ATW, such as described with respect to FIG. 12.

Figure 13:
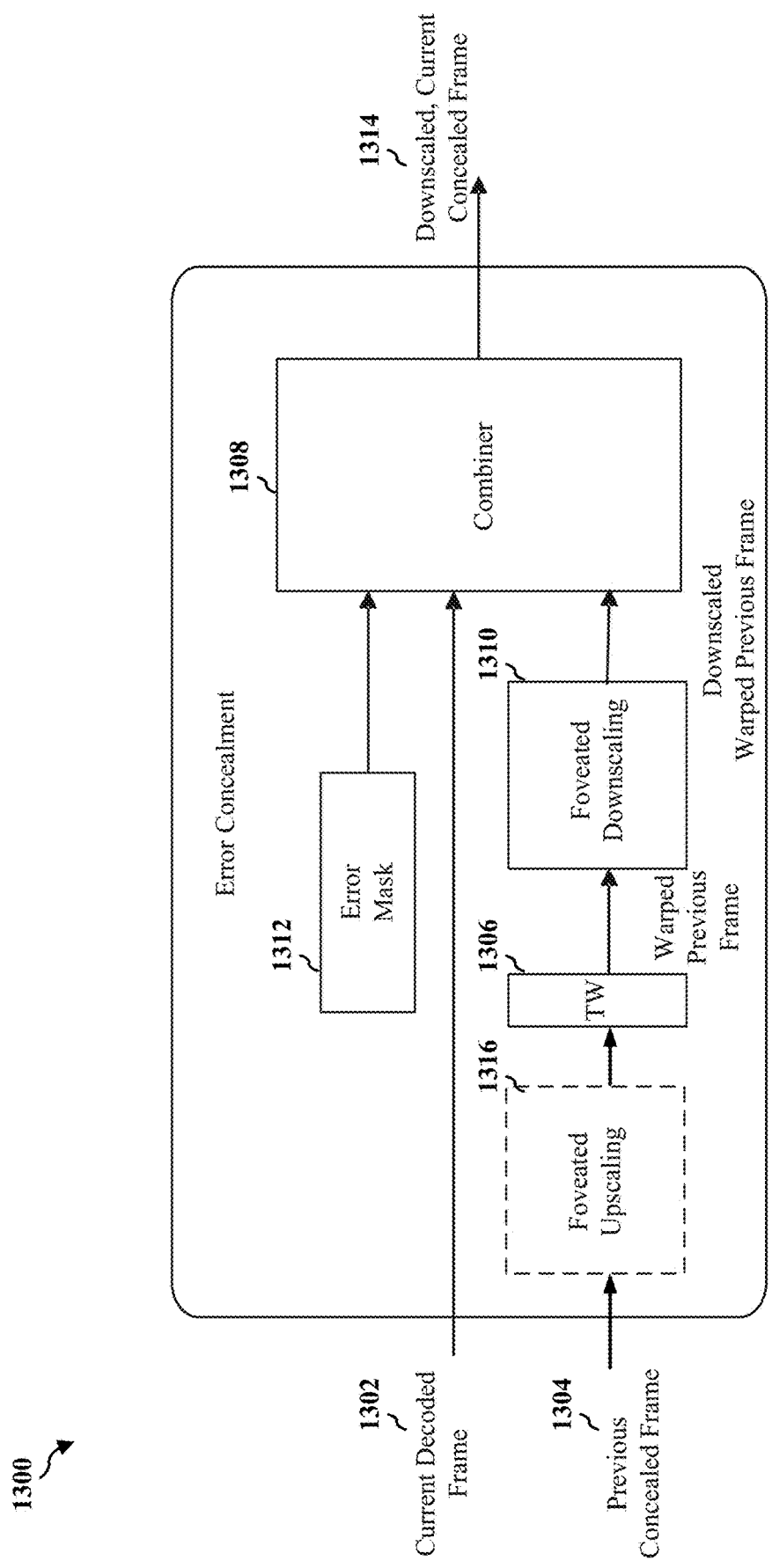
FIG. 13 illustrates another example diagram including time warp-based error concealment and foveated compression in accordance with one or more techniques of this disclosure.

In one example, the error concealment can have input and output textures of the same type, none of which may have any non-uniform scaling. For example, referring to FIG. 11, stock concealed frame n 1102 and warped frame 1104 that are combined by combiner 1106 may both be unscaled (e.g. without downscaling or upscaling). In another example, one of the frames may include downscaling or upscaling while the other may be unscaled. FIG. 13 illustrates an example 1300 of an aspect of the present disclosure that reconciles foveated compression and time-warp based concealment when the previous frame is upscaled (and thus foveated upscaling block 1316 is omitted). For instance, a decoded texture 1302 can include foveated downscaling, where packet errors are realized in the downscaled domain. The previous reconstructed frame 1304 can include foveated upsampling, i.e., it does not have a non-linear effect, such that time-warp homography can be applied at 1306 to such a linearly scaled image as described with respect to FIG. 8 or 10. However, in some aspects, a combiner block 1308 (e.g., combiner 1106) can combine a non-linearly scaled decoder output (e.g., decoded texture 1302 with downscaling) with the warped previous frame that does not have this non-linearity (e.g., previous reconstructed frame 1304 with upscaling). To accomplish this combination, foveated downscaling 1310 such as described above can be applied on the warped previous frame prior to the combiner 1308 consuming the frame. The combiner 1308 can then combine the downscaled current frame and the downscaled warped previous frame based on an error mask 1312, such as described with respect to FIG. 11, to generate a downscaled, current concealed frame 1314.

Aspects of the present disclosure can also combine the aforementioned example of FIG. 13 with the modified ATW of previous methods that combines foveated upscaling and ATW into a single operation. In such example, the reconstructed frame (e.g., previous reconstructed frame 1304) that is input to the ATW (e.g. at 1306) for display can include foveated downscaling. This can mean the previous reconstructed frame 1304 can include foveated downscaling (rather than upscaling as in the previous example), and therefore in order to use time warp-based error concealment, the previous reconstructed frame 1304 is first upscaled at 1316 before time warp is applied at 1306. This is can be the purpose of additional foveated upscaling block 1316.

As mentioned previously, aspects of the present disclosure can change the mesh dynamically based on the communication quality. Aspects of the present disclosure can also combine the foveated upscaling with the time warp on the client. Aspects of the present disclosure can also combine the foveated upscaling with a concealment technique.

Aspects of the present disclosure also provide multiple fovea support. In one aspect, a scene or rendered frame may be susceptible to artifacts due to spatial compression (e.g. basis pattern, blocking, blurring, color bleeding, ringing, etc.). For example, the server may identify areas of a scene such as regions with texture, sharp edges, edges between colors in an image with low chroma subsampling, diagonal or curved edges, or other such areas that may result in spatial artifacts during compression. To address these artifacts during foveated compression, the server may apply a foveation transfer function curve with multiple centers individually located at each area. For example, the server may apply a modification of the foveation transfer function plot 400, 450 of FIGS. 4A and 4B including multiple centers/peaks or foveal regions 402, 452 individually applied at each of these areas. Such modified foveation transfer function plot may be a summation or combination of multiple foveation transfer function plots 402, 450 shifted to have different centers/peaks or foveal regions around these areas of spatial artifacts. The foveated mesh 712 and inverted mesh 714 may then be changed accordingly to correspond to the multiple foveal regions to arrive at the compressed and decompressed output respectively. As a result, more compression may be applied between portions of a frame which are susceptible to spatial artifacts.

In another aspect of multiple fovea support, a server or client may predict a potential eye pose based on a specific client-side display time when determining foveal regions by eye-tracking. For example, the server or client may determine that eye movement from one location of a current frame (e.g. a center of the frame) to another location (e.g. a periphery of the frame) may likely occur at an absolute specified time or at a time relative to the current frame. In such case, the server or client may dynamically change the foveated mesh 712 and inverted mesh 714 respectively such that multiple foveal regions 402, 452 are centered around the current and predicted foci of the eye. For instance, when performing foveated compression and decompression respectively for each frame, the server and client may apply a modification of the foveation transfer function plot 400, 450 of FIGS. 4A and 4B including multiple centers/peaks or foveal regions 402, 452 individually applied at each of these foci. Such use of multiple fovea may be helpful in situations with high round trip delays or times by allowing higher compression factors (e.g. smaller foveal regions) to be applied.

Figure 14:
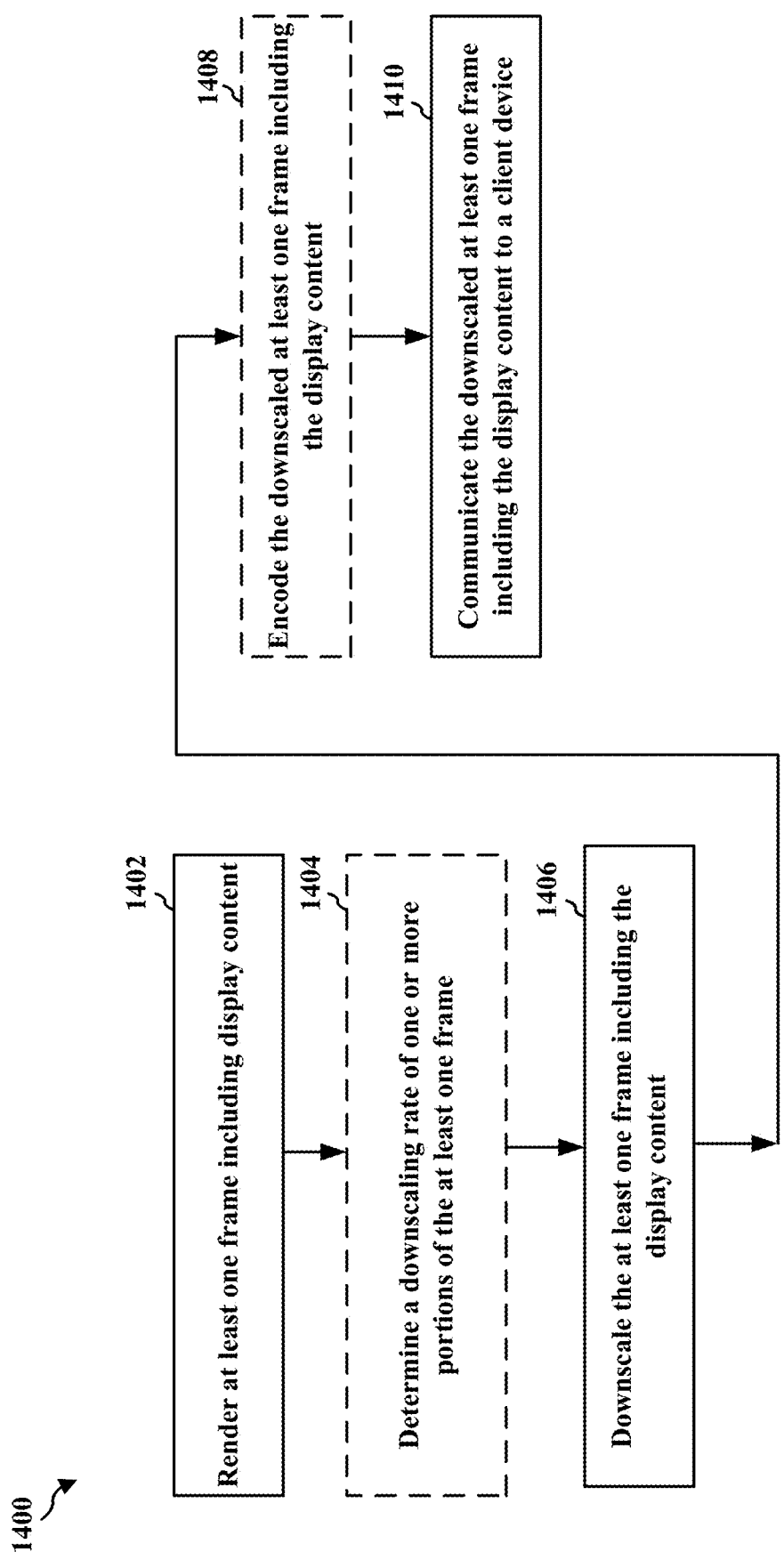
FIG. 14 is a flowchart of an example method in accordance with one or more techniques of this disclosure.

FIG. 14 illustrates an example flowchart 1400 of an example method in accordance with one or more techniques of this disclosure. The method may be performed by an apparatus, e.g., device 104, such as a server, a CPU, a GPU, or an apparatus for computer or graphics processing. For example, the apparatus may be rendering server 202. Optional aspects are illustrated in dashed lines.

At 1402, the apparatus may render at least one frame including display content, as described in connection with the examples in FIGS. 2-7 and 9. In some aspects, a downscaling rate of one or more portions of the at least one frame can be based on a location of each of the one or more portions, e.g., wherein the location is within one or more foveal regions, within a peripheral region, and/or within a center region, as described in connection with the examples in FIGS. 2-7.

At 1404, the apparatus can determine the downscaling rate of the one or more portions of the at least one frame based on at least one of dimensions of the at least one frame, a field of view associated with the at least one frame, a fovea angle associated with the at least one frame, or one or more foveal regions associated with the at least one frame, as described in connection with the examples in FIGS. 2-7 and 9.

At 1406, the apparatus can downscale the at least one frame including the display content, as described in connection with the examples in FIGS. 2-7 and 9. In one example, the downscaling rate of the one or more portions of the at least one frame can be fixed over a period of time, as described in connection with the examples in FIGS. 2-7 and 9. In another example, the downscaling rate of the one or more portions of the at least one frame can be based on a QoS level for communication between the server and the client device, as described in connection with the examples in FIGS. 2-7 and 9. In another example, the location of each of the one or more portions can be based on an eye-tracked position of the client device, as described in connection with the examples in FIGS. 2-7 and 9. In another example, the downscaling rate of the one or more portions of the at least one frame can be based on a roundtrip delay associated with the rendering and the communicating, as described in connection with the examples in FIGS. 2-7 and 9. In another example, the downscaling rate of the one or more portions of the at least one frame can be based on a compression ratio between the at least one frame and the downscaled at least one frame, as described in connection with the examples in FIGS. 2-7 and 9. In another example, the rendering at 1402 can be further based on the location of each of the one or more portions of the at least one frame, where the rendering is aligned with the downscaling, as described in connection with the examples in FIGS. 2-7 and 9.

At 1408, the apparatus can also encode the downscaled at least one frame including the display content, as described in connection with the examples in FIGS. 2-7 and 9. Finally, at 1410, the apparatus can communicate the downscaled at least one frame including the display content to a client device, as described in connection with the examples in FIGS. 2-7 and 9.

Figure 15:
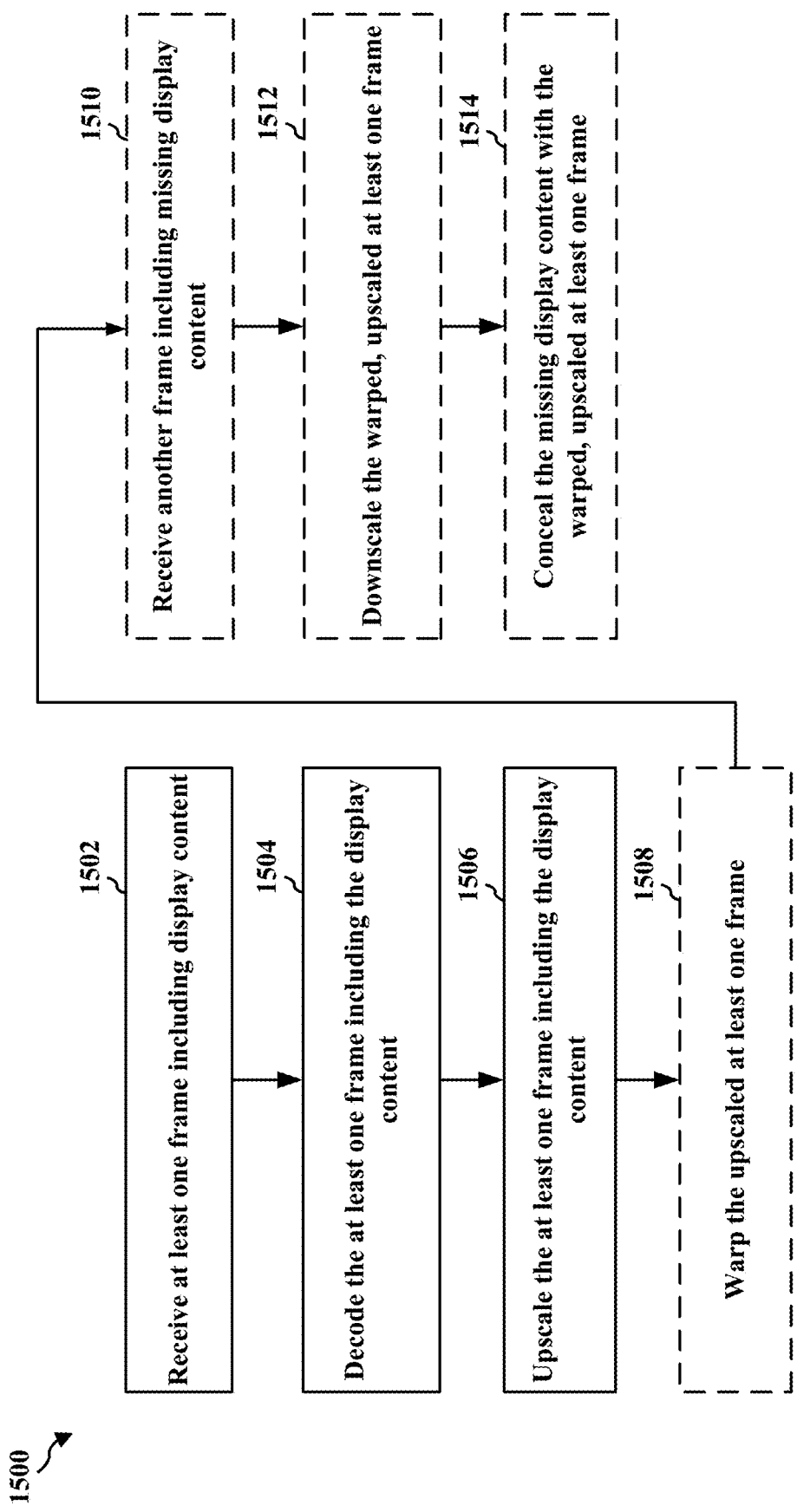
FIG. 15 is a flowchart of an example method in accordance with one or more techniques of this disclosure.

FIG. 15 illustrates an example flowchart 1500 of an example method in accordance with one or more techniques of this disclosure. The method may be performed by an apparatus, e.g., device 104, such as a client device, a CPU, a GPU, or an apparatus for computer or graphics processing. For example, apparatus may be remote client 204. Optional aspects are illustrated in dashed lines.

At 1502, the apparatus receives at least one frame including display content, e.g., from a server, as described in connection with the examples in FIGS. 2-13. At 1504, the apparatus decodes the at least one frame including the display content, as described in connection with the examples in FIGS. 2-13.

At 1506, the apparatus upscales the at least one frame including the display content, as described in connection with the examples in FIGS. 2-13. In some instances, an upscaling rate of one or more portions of the at least one frame can be based on a location of each of the one or more portions, as described in connection with the examples in FIGS. 2-13. For instance, the apparatus can determine the upscaling rate of the one or more portions of the at least one frame based on at least one of dimensions of the at least one frame, a field of view associated with the at least one frame, a fovea angle associated with the at least one frame, or one or more foveal regions associated with the at least one frame, as described in connection with the examples in FIGS. 2-13. In one example, the upscaling rate of the one or more portions of the at least one frame can be fixed over a period of time, as described in connection with the examples in FIGS. 2-13. In another example, the upscaling rate of the one or more portions of the at least one frame can be based on a QoS level for communication between the server and the client device, as described in connection with the examples in FIGS. 2-13. In another example, the location of each of the one or more portions can be based on an eye-tracked position of the client device, as described in connection with the examples in FIGS. 2-13. In another example, the upscaling rate of the one or more portions of the at least one frame can be based on a roundtrip delay associated with the receiving, as described in connection with the examples in FIGS. 2-13. In another example, the upscaling rate of the one or more portions of the at least one frame can be based on a compression ratio between the upscaled at least one frame and the at least one frame, as described in connection with the examples in FIGS. 2-13.

At 1508, the apparatus can warp the upscaled at least one frame, as described in connection with the examples in FIGS. 2-13. At 1510, the apparatus can receive another frame including missing display content, as described in connection with the examples in FIGS. 2-13. At 1512, the apparatus can downscale the warped, upscaled at least one frame, as described in connection with the examples in FIGS. 2-13. Finally at 1514, the apparatus can conceal the missing display content with the warped, upscaled at least one frame, as described in connection with the examples in FIGS. 2-13. The downscaling at 1512 can occur prior to the concealing at 1514.

In some instances, a client device can receive, decode, and/or upscale the at least one frame including the display content, as described in connection with the examples in FIGS. 2-13. In some aspects, the server can be an edge server or a cloud server, as described in connection with the examples in FIGS. 2-13. Additionally, the client device can be a HMD or a headset, as described in connection with the examples in FIGS. 2-13.

In one configuration, a method or apparatus for graphics processing is provided. The apparatus may be a server, a CPU, a GPU, or some other processor that can perform computer or graphics processing. In one aspect, the apparatus may be the processing unit 120 within the device 104, or may be some other hardware within device 104 or another device. The apparatus may include means for rendering at least one frame including display content. The apparatus may also include means for downscaling the at least one frame including the display content. The apparatus may also include means for communicating the downscaled at least one frame including the display content to a client device. The apparatus may also include means for determining the downscaling rate of the one or more portions of the at least one frame based on at least one of dimensions of the at least one frame, a field of view associated with the at least one frame, or a fovea angle associated with the at least one frame. The apparatus may include means for encoding the downscaled at least one frame including the display content.

In one configuration, a method or apparatus for graphics processing is provided. The apparatus may be a client device, a CPU, a GPU, or some other processor that can perform computer or graphics processing. In one aspect, the apparatus may be the processing unit 120 within the device 104, or may be some other hardware within device 104 or another device. The apparatus may include means for receiving at least one frame including display content. The apparatus may also include means for decoding the encoded at least one frame including the display content. The apparatus may also include means for upscaling the at least one frame including the display content. The apparatus may also include means for warping the upscaled at least one frame. The apparatus may also include means for receiving another frame including missing display content. The apparatus may also include means for concealing the missing display content with the warped, upscaled at least one frame. The apparatus may also include means for downscaling the warped, upscaled at least one frame prior to concealing the missing display content.

The subject matter described herein can be implemented to realize one or more benefits or advantages. For instance, the described graphics processing techniques can be used by a server, a client, a GPU, a CPU, or some other processor that can perform computer or graphics processing to implement the foveated compression techniques described herein. This can also be accomplished at a low cost compared to other computer or graphics processing techniques. Moreover, the computer or graphics processing techniques herein can improve or speed up data processing or execution. Further, the computer or graphics processing techniques herein can improve resource or data utilization and/or resource efficiency.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following examples are illustrative only and may be combined with aspects of other embodiments or teachings described herein, without limitation.

Example 1 is a method of graphics processing, comprising: rendering at least one frame including display content; downscaling the at least one frame including the display content, wherein a downscaling rate of one or more portions of the at least one frame is based on a location of each of the one or more portions; and communicating the downscaled at least one frame including the display content to a client device.

Example 2 is the method of Example 1, further comprising: determining the downscaling rate of the one or more portions of the at least one frame based on at least one of dimensions of the at least one frame, a field of view associated with the at least one frame, a fovea angle associated with the at least one frame, or one or more foveal regions associated with the at least one frame.

Example 3 is the method of Example 1 or 2, wherein the downscaling rate of the one or more portions of the at least one frame is fixed over a period of time.

Example 4 is the method of any of Examples 1 to 3, wherein the downscaling rate of the one or more portions of the at least one frame is based on a quality of service (QoS) level for communication between a server and the client device.

Example 5 is the method of any of Examples 1 to 4, wherein the location of each of the one or more portions is based on an eye-tracked position of the client device.

Example 6 is the method of any of Examples 1 to 5, wherein the downscaling rate of the one or more portions of the at least one frame is based on a roundtrip delay associated with the rendering and the communicating.

Example 7 is the method of any of Examples 1 to 6, wherein the downscaling rate of the one or more portions of the at least one frame is based on a compression ratio between the at least one frame and the downscaled at least one frame.

Example 8 is the method of any of Examples 1 to 7, wherein the rendering is further based on the location of each of the one or more portions of the at least one frame, and wherein the rendering is aligned with the downscaling.

Example 9 is the method of any of Examples 1 to 8, further comprising: encoding the downscaled at least one frame including the display content.

Example 10 is an apparatus for graphics processing, comprising: a memory; and at least one processor coupled to the memory and configured to: render at least one frame including display content; downscale the at least one frame including the display content, wherein a downscaling rate of one or more portions of the at least one frame is based on a location of each of the one or more portions; and communicate the downscaled at least one frame including the display content to a client device.

Example 11 is the apparatus of Example 10, wherein the at least one processor is further configured to determine the downscaling rate of the one or more portions of the at least one frame based on at least one of dimensions of the at least one frame, a field of view associated with the at least one frame, a fovea angle associated with the at least one frame, or one or more foveal regions associated with the at least one frame.

Example 12 is the apparatus of Examples 10 or 11, wherein the downscaling rate of the one or more portions of the at least one frame is fixed over a period of time.

Example 13 is the apparatus of any of Examples 10 to 12, wherein the downscaling rate of the one or more portions of the at least one frame is based on a quality of service (QoS) level for communication between a server and the client device.

Example 14 is the apparatus of any of Examples 10 to 13, wherein the location of each of the one or more portions is based on an eye-tracked position of the client device.

Example 15 is the apparatus of any of Examples 10 to 14, wherein the downscaling rate of the one or more portions of the at least one frame is based on a roundtrip delay associated with the rendering and the communicating.

Example 16 is the apparatus of any of Examples 10 to 15, wherein the downscaling rate of the one or more portions of the at least one frame is based on a compression ratio between the at least one frame and the downscaled at least one frame.

Example 17 is the apparatus of any of Examples 10 to 16, wherein the rendering is further based on the location of each of the one or more portions of the at least one frame, and wherein the rendering is aligned with the downscaling.

Example 18 is the apparatus of any of Examples 10 to 17, wherein the at least one processor is further configured to encode the downscaled at least one frame including the display content.

Example 19 is an apparatus for graphics processing, comprising: means for rendering at least one frame including display content; means for downscaling the at least one frame including the display content, wherein a downscaling rate of one or more portions of the at least one frame is based on a location of each of the one or more portions; and means for communicating the downscaled at least one frame including the display content to a client device.

Example 20 is the apparatus of Example 19, further comprising: means for determining the downscaling rate of the one or more portions of the at least one frame based on at least one of dimensions of the at least one frame, a field of view associated with the at least one frame, a fovea angle associated with the at least one frame, or one or more foveal regions associated with the at least one frame.

Example 21 is the apparatus of Example 19 or 20, wherein the downscaling rate of the one or more portions of the at least one frame is fixed over a period of time.

Example 22 is the apparatus of any of Examples 19 to 21, wherein the downscaling rate of the one or more portions of the at least one frame is based on a quality of service (QoS) level for communication between a server and the client device.

Example 23 is the apparatus of any of Examples 19 to 22, wherein the location of each of the one or more portions is based on an eye-tracked position of the client device.

Example 24 is the apparatus of any of Examples 19 to 23, wherein the downscaling rate of the one or more portions of the at least one frame is based on a roundtrip delay associated with the rendering and the communicating.

Example 25 is the apparatus of any of Examples 19 to 24, wherein the downscaling rate of the one or more portions of the at least one frame is based on a compression ratio between the at least one frame and the downscaled at least one frame.

Example 26 is the apparatus of any of Examples 19 to 25, wherein the rendering is further based on the location of each of the one or more portions of the at least one frame, and wherein the rendering is aligned with the downscaling.

Example 27 is the apparatus of any of Examples 19 to 26, further comprising: means for encoding the downscaled at least one frame including the display content.

Example 28 is a computer-readable medium storing computer executable code, the code when executed by a processor cause the processor to: render at least one frame including display content; downscale the at least one frame including the display content, wherein a downscaling rate of one or more portions of the at least one frame is based on a location of each of the one or more portions; and communicate the downscaled at least one frame including the display content to a client device.

Example 29 is a method of graphics processing, comprising: receiving at least one frame including display content; decoding the at least one frame including the display content; and upscaling the at least one frame including the display content, wherein an upscaling rate of one or more portions of the at least one frame is based on a location of each of the one or more portions.

Example 30 is the method of Example 29, wherein the upscaling rate of the one or more portions of the at least one frame is fixed over a period of time.

Example 31 is the method of Examples 29 or 30, wherein the upscaling rate of the one or more portions of the at least one frame is based on a quality of service (QoS) level for communication between a server and a client device.

Example 32 is the method of any of Examples 29 to 31, wherein the location of each of the one or more portions is based on an eye-tracked position of a client device.

Example 33 is the method of any of Examples 29 to 32, wherein the upscaling rate of the one or more portions of the at least one frame is based on one of: a roundtrip delay associated with the receiving, or a compression ratio between the upscaled at least one frame and the at least one frame.

Example 34 is the method of any of Examples 29 to 33, further comprising: warping the upscaled at least one frame.

Example 35 is the method of any of Examples 29 to 34, further comprising: receiving another frame including missing display content; and concealing the missing display content with the warped, upscaled at least one frame.

Example 36 is the method of any of Examples 29 to 35, further comprising:
downscaling the warped, upscaled at least one frame prior to concealing the missing display content.

Example 37 is an apparatus for graphics processing, comprising: a memory; and at least one processor coupled to the memory and configured to: receive at least one frame including display content; decode the at least one frame including the display content; and upscale the at least one frame including the display content, wherein an upscaling rate of one or more portions of the at least one frame is based on a location of each of the one or more portions.

Example 38 is the apparatus of Example 37, wherein the upscaling rate of the one or more portions of the at least one frame is fixed over a period of time.

Example 39 is the apparatus of Examples 37 or 38, wherein the upscaling rate of the one or more portions of the at least one frame is based on a quality of service (QoS) level for communication between a server and a client device.

Example 40 is the apparatus of any of Examples 37 to 39, wherein the location of each of the one or more portions is based on an eye-tracked position of a client device.

Example 41 is the apparatus of any of Examples 37 to 40, wherein the upscaling rate of the one or more portions of the at least one frame is based on one of: a roundtrip delay associated with the receiving, or a compression ratio between the upscaled at least one frame and the at least one frame.

Example 42 is the apparatus of any of Examples 37 to 41, wherein the at least one processor is further configured to: warp the upscaled at least one frame.

Example 43 is the apparatus of any of Examples 37 to 42, wherein the at least one processor is further configured to: receive another frame including missing display content; and conceal the missing display content with the warped, upscaled at least one frame.

Example 44 is the apparatus of any of Examples 37 to 43, wherein the at least one processor is further configured to: downscale the warped, upscaled at least one frame prior to concealing the missing display content.

Example 45 is an apparatus for graphics processing, comprising: means for receiving at least one frame including display content; means for decoding the at least one frame including the display content; and means for upscaling the at least one frame including the display content, wherein an upscaling rate of one or more portions of the at least one frame is based on a location of each of the one or more portions.

Example 46 is the apparatus of Example 45, wherein the upscaling rate of the one or more portions of the at least one frame is fixed over a period of time.

Example 47 is the apparatus of Examples 45 or 46, wherein the upscaling rate of the one or more portions of the at least one frame is based on a quality of service (QoS) level for communication between a server and a client device.

Example 48 is the apparatus of any of Examples 45 to 47, wherein the location of each of the one or more portions is based on an eye-tracked position of a client device.

Example 49 is the apparatus of any of Examples 45 to 48, wherein the upscaling rate of the one or more portions of the at least one frame is based on one of: a roundtrip delay associated with the receiving, or a compression ratio between the upscaled at least one frame and the at least one frame.

Example 50 is the apparatus of any of Examples 45 to 49, further comprising: means for warping the upscaled at least one frame.

Example 51 is the apparatus of any of Examples 45 to 50, further comprising: means for receiving another frame including missing display content; and means for concealing the missing display content with the warped, upscaled at least one frame.

Example 52 is the apparatus of any of Examples 45 to 51, further comprising: means for downscaling the warped, upscaled at least one frame prior to concealing the missing display content.

Example 53 is a computer-readable medium storing computer executable code, the code when executed by a processor cause the processor to: receive at least one frame including display content; decode the at least one frame including the display content; and upscale the at least one frame including the display content, wherein an upscaling rate of one or more portions of the at least one frame is based on a location of each of the one or more portions.

What is claimed is:

1. A method of graphics processing, comprising:
generating a foveated mesh for generating non-rectangular pulled-in frames;
rendering at least one frame including display content;
generating, based on the at least one frame and the foveated mesh, at least one non-rectangular pulled-in frame including the display content, wherein the at least one non-rectangular pulled-in frame is smaller in size than the at least one frame and comprises:
at least one downscaled portion that is downscaled from the at least one frame; and
at least one preserved portion with pixels preserved at a 1:1 ratio from the at least one frame, wherein a size of the at least one preserved portion is determined in response to network constraints;
and
communicating the at least one non-rectangular pulled-in frame including the display content to a client device.

2. The method of claim 1, further comprising:
determining the downscaling rate of the at least one downscaled portion based on at least one of dimensions of the at least one frame, a field of view associated with the at least one frame, a fovea angle associated with the at least one frame, or one or more foveal regions associated with the at least one frame.

3. The method of claim 1, wherein the downscaling rate of the at least one downscaled portion is fixed over a period of time.

4. The method of claim 1, wherein the downscaling rate of the at least one downscaled portion is based on a quality of service (QOS) level for communication between a server and the client device.

5. The method of claim 1, wherein a location of the at least one downscaled portion and a location of the at least one preserved portion within the at least one non-rectangular pulled-in frame are based on an eye-tracked position of the client device.

6. The method of claim 1, wherein the downscaling rate of the at least one downscaled portion is based on a roundtrip delay associated with the rendering and the communicating.

7. The method of claim 1, wherein the downscaling rate of the at least one downscaled portion is based on a compression ratio between the at least one frame and the at least one non-rectangular pulled-in frame.

8. The method of claim 1, wherein the rendering is at varied resolutions across the at least one frame, and wherein the rendering is aligned with the downscaling.

9. The method of claim 1, further comprising:
encoding the at least one non-rectangular pulled-in frame including the display content.

10. An apparatus for graphics processing, comprising:
a memory; and
at least one processor coupled to the memory and configured to:
generate a foveated mesh to generate non-rectangular pulled-in frames;
render at least one frame including display content;
generate, based on the at least one frame and the foveated mesh, at least one non-rectangular pulled-in frame including the display content, wherein the at least one non-rectangular pulled-in frame is smaller in size than the at least one frame and comprises:
at least one downscaled portion that is downscaled from the at least one frame; and
at least one preserved portion with pixels preserved at a 1:1 ratio from the at least one frame, wherein a size of the at least one preserved portion is determined in response to network constraints; and
communicate the at least one non-rectangular pulled-in frame including the display content to a client device.

11. The apparatus of claim 10, wherein the at least one processor is further configured to determine the downscaling rate of the at least one downscaled portion based on at least one of dimensions of the at least one frame, a field of view associated with the at least one frame, a fovea angle associated with the at least one frame, or one or more foveal regions associated with the at least one frame.

12. The apparatus of claim 10, wherein the downscaling rate of the at least one downscaled portion is based on a quality of service (QOS) level for communication between a server and the client device.

13. The apparatus of claim 10, wherein the downscaling rate of the at least one downscaled portion is based on a roundtrip delay associated with the rendering and the communicating.

14. The apparatus of claim 10, wherein the downscaling rate of the at least one downscaled portion is based on a compression ratio between the at least one frame and the at least one non-rectangular pulled-in frame.

15. The apparatus of claim 10, wherein the at least one processor is further configured to render the at least one frame at varied resolutions across the at least one frame, and wherein the rendering is aligned with the downscaling.

16. The apparatus of claim 10, wherein the at least one processor is further configured to encode the at least one non-rectangular pulled-in frame including the display content.

17. A method of graphics processing, comprising:
generating an inverted mesh corresponding to an inversion of a foveated mesh for applying to non-rectangular pulled-in frames;

receiving at least one non-rectangular pulled-in frame including display content, wherein the at least one non-rectangular pulled-in frame comprises:
    at least one downscaled portion that is downscaled from at least one original frame; and
    at least one preserved portion with pixels preserved at a 1:1 ratio from the at least one original frame, wherein a size of the at least one preserved portion is determined in response to network constraints;
decoding the at least one non-rectangular pulled-in frame including the display content; and
increasing a size of the at least one non-rectangular pulled-in frame by applying the inverted mesh to the at least one non-rectangular pulled-in frame for at least upscaling the at least one downscaled portion and preserving a size of the at least one preserved portion.

18. The method of claim 17, wherein the upscaling rate of the at least one downscaled portion is fixed over a period of time.

19. The method of claim 17, wherein the upscaling rate of the at least one downscaled portion is based on a quality of service (QoS) level for communication between a server and a client device.

20. The method of claim 17, wherein a location of the at least one downscaled portion and a location of the at least one preserved portion within the at least one non-rectangular pulled-in frame are based on an eye-tracked position of a client device.

21. The method of claim 17, wherein the upscaling rate of the at least one downscaled portion is based on one of: a roundtrip delay associated with the receiving, or a compression ratio between the at least one non-rectangular pulled-in frame and the at least one original frame.

22. The method of claim 17, further comprising:
warping the upscaled at least one non-rectangular pulled-in frame.

23. The method of claim 22, further comprising:
receiving another frame including missing display content; and
concealing the missing display content with the warped, upscaled at least one non-rectangular pulled-in frame.

24. The method of claim 23, further comprising:
downscaling the warped, upscaled at least one non-rectangular pulled-in frame prior to concealing the missing display content.

25. An apparatus for graphics processing, comprising:
a memory; and
at least one processor coupled to the memory and configured to:
    generate an inverted mesh corresponding to an inversion of a foveated mesh to apply to non-rectangular pulled-in frames;
    receive at least one non-rectangular pulled-in frame including display content, wherein the at least one non-rectangular pulled-in frame comprises:
        at least one downscaled portion that is downscaled from at least one original frame; and
        at least one preserved portion with pixels preserved at a 1:1 ratio from the at least one original frame, wherein a size of the at least one preserved portion is determined in response to network constraints;
    decode the at least one non-rectangular pulled-in frame including the display content; and
    increase a size of the at least one non-rectangular pulled-in frame by application of the inverted mesh to the at least one non-rectangular pulled-in frame to at least upscale the at least one downscaled portion and preserve a size of the at least one preserved portion.

26. The apparatus of claim 25, wherein the upscaling rate of the at least one downscaled portion is based on a quality of service (QoS) level for communication between a server and a client device.

27. The apparatus of claim 25, wherein the upscaling rate of the at least one downscaled portion is based on one of: a roundtrip delay associated with the receiving, or a compression ratio between the at least one non-rectangular pulled-in frame and the at least one original frame.

28. The apparatus of claim 25, wherein the at least one processor is further configured to warp the upscaled at least one non-rectangular pulled-in frame.

29. The apparatus of claim 28, wherein the at least one processor is further configured to:
receive another frame including missing display content; and
conceal the missing display content with the warped, upscaled at least one non-rectangular pulled-in frame.

30. The apparatus of claim 29, wherein the at least one processor is further configured to downscale the warped, upscaled at least one non-rectangular pulled-in frame prior to concealing the missing display content.

* * * * *